(12) United States Patent
Wang et al.

(10) Patent No.: US 10,067,509 B1
(45) Date of Patent: Sep. 4, 2018

(54) SYSTEM AND METHOD FOR OCCLUDING CONTOUR DETECTION

(71) Applicant: TuSimple, San Diego, CA (US)

(72) Inventors: Panqu Wang, San Diego, CA (US); Pengfei Chen, San Diego, CA (US); Zehua Huang, San Diego, CA (US)

(73) Assignee: TUSIMPLE, San Diego, CA (US)

( * ) Notice: Subject to any disclaimer, the term of this patent is extended or adjusted under 35 U.S.C. 154(b) by 0 days.

(21) Appl. No.: 15/693,446

(22) Filed: Aug. 31, 2017

Related U.S. Application Data

(63) Continuation-in-part of application No. 15/456,219, filed on Mar. 10, 2017.

(51) Int. Cl.

| G05D 1/02 | (2006.01) |
|---|---|
| G06N 3/08 | (2006.01) |
| G06N 3/04 | (2006.01) |
| G05D 1/00 | (2006.01) |
| G06K 9/66 | (2006.01) |
| G06T 7/70 | (2017.01) |
| G06K 9/46 | (2006.01) |
| G06T 7/11 | (2017.01) |

(52) U.S. Cl.
CPC ......... *G05D 1/0231* (2013.01); *G05D 1/0088* (2013.01); *G06K 9/4628* (2013.01); *G06K 9/66* (2013.01); *G06N 3/04* (2013.01); *G06N 3/08* (2013.01); *G06T 7/11* (2017.01); *G06T 7/70* (2017.01); *G05D 2201/0212* (2013.01)

(58) Field of Classification Search
CPC ............... G05D 1/0231; G05D 1/0088; G05D 2201/0212; G06N 3/08; G06N 3/04; G06K 9/66; G06K 9/4628; G06T 7/70; G06T 7/11
See application file for complete search history.

(56) References Cited

U.S. PATENT DOCUMENTS

| 7,689,559 | B2 | 3/2010 | Canright |
|---|---|---|---|
| 7,844,595 | B2 | 11/2010 | Canright |
| 8,041,111 | B1 | 10/2011 | Wilensky |
| 8,064,643 | B2 | 11/2011 | Stein |

(Continued)

FOREIGN PATENT DOCUMENTS

| EP | 1754179 A1 | 2/2007 |
|---|---|---|
| EP | 2448251 A2 | 5/2012 |

(Continued)

OTHER PUBLICATIONS

Hou, Xiaodi and Zhang, Liqing, "Saliency Detection: A Spectral Residual Approach", Computer Vision and Pattern Recognition, CVPR'07—IEEE Conference, pp. 1-8, 2007.

(Continued)

*Primary Examiner* — Frederick M Brushaber
(74) *Attorney, Agent, or Firm* — Inventive Law Inc.; Jim H. Salter

(57) ABSTRACT

A system method for occluding contour detection using a fully convolutional neural network is disclosed. A particular embodiment includes: receiving an input image; producing a feature map from the input image by semantic segmentation; applying a Dense Upsampling Convolution (DUC) operation on the feature map to produce contour information of objects and object instances detected in the input image; and applying the contour information onto the input image.

18 Claims, 20 Drawing Sheets

(56) References Cited

U.S. PATENT DOCUMENTS

| | | |
|---|---|---|
| 8,082,101 B2 | 12/2011 | Stein |
| 8,164,628 B2 | 4/2012 | Stein |
| 8,175,376 B2 | 5/2012 | Marchesotti |
| 8,271,871 B2 | 9/2012 | Marchesotti |
| 8,378,851 B2 | 2/2013 | Stein |
| 8,392,117 B2 | 3/2013 | Dolgov |
| 8,401,292 B2 | 3/2013 | Park |
| 8,478,072 B2 | 7/2013 | Aisaka |
| 8,553,088 B2 | 10/2013 | Stein |
| 8,908,041 B2 | 12/2014 | Stein |
| 8,917,169 B2 | 12/2014 | Schofield |
| 8,963,913 B2 | 2/2015 | Baek |
| 8,981,966 B2 | 3/2015 | Stein |
| 8,993,951 B2 | 3/2015 | Schofield |
| 9,008,369 B2 | 4/2015 | Schofield |
| 9,025,880 B2 | 5/2015 | Perazzi |
| 9,042,648 B2 | 5/2015 | Wang |
| 9,111,444 B2 | 8/2015 | Kaganovich |
| 9,117,133 B2 | 8/2015 | Barnes |
| 9,118,816 B2 | 8/2015 | Stein |
| 9,120,485 B1 | 9/2015 | Dolgov |
| 9,122,954 B2 | 9/2015 | Srebnik |
| 9,134,402 B2 | 9/2015 | Sebastian |
| 9,145,116 B2 | 9/2015 | Clarke |
| 9,147,255 B1 | 9/2015 | Zhang |
| 9,156,473 B2 | 10/2015 | Clarke |
| 9,176,006 B2 | 11/2015 | Stein |
| 9,179,072 B2 | 11/2015 | Stein |
| 9,183,447 B1 | 11/2015 | Gdalyahu |
| 9,185,360 B2 | 11/2015 | Stein |
| 9,191,634 B2 | 11/2015 | Schofield |
| 9,233,659 B2 | 1/2016 | Rosenbaum |
| 9,233,688 B2 | 1/2016 | Clarke |
| 9,248,832 B2 | 2/2016 | Huberman |
| 9,251,708 B2 | 2/2016 | Rosenbaum |
| 9,277,132 B2 | 3/2016 | Berberian |
| 9,280,711 B2 | 3/2016 | Stein |
| 9,286,522 B2 | 3/2016 | Stein |
| 9,297,641 B2 | 3/2016 | Stein |
| 9,299,004 B2 | 3/2016 | Lin |
| 9,315,192 B1 | 4/2016 | Zhu |
| 9,317,776 B1 | 4/2016 | Honda |
| 9,330,334 B2 | 5/2016 | Lin |
| 9,355,635 B2 | 5/2016 | Gao |
| 9,365,214 B2 | 6/2016 | Ben Shalom |
| 9,428,192 B2 | 8/2016 | Schofield |
| 9,436,880 B2 | 9/2016 | Bos |
| 9,438,878 B2 | 9/2016 | Niebla |
| 9,443,163 B2 | 9/2016 | Springer |
| 9,446,765 B2 | 9/2016 | Ben Shalom |
| 9,459,515 B2 | 10/2016 | Stein |
| 9,466,006 B2 | 10/2016 | Duan |
| 9,476,970 B1 | 10/2016 | Fairfield |
| 9,490,064 B2 | 11/2016 | Hirosawa |
| 9,531,966 B2 | 12/2016 | Stein |
| 9,555,803 B2 | 1/2017 | Pawlicki |
| 2007/0230792 A1 | 10/2007 | Shashua |
| 2010/0134517 A1* | 6/2010 | Saikaly .............. G06T 7/0012 345/619 |
| 2010/0226564 A1 | 9/2010 | Marchesotti |
| 2010/0281361 A1 | 11/2010 | Marchesotti |
| 2011/0206282 A1 | 8/2011 | Aisaka |
| 2012/0105639 A1 | 5/2012 | Stein |
| 2012/0140076 A1 | 6/2012 | Rosenbaum |
| 2012/0274629 A1 | 11/2012 | Baek |
| 2014/0145516 A1 | 5/2014 | Hirosawa |
| 2014/0198184 A1 | 7/2014 | Stein |
| 2015/0062304 A1 | 3/2015 | Stein |
| 2015/0353082 A1 | 12/2015 | Lee |
| 2016/0037064 A1 | 2/2016 | Stein |
| 2016/0094774 A1 | 3/2016 | Li |
| 2016/0129907 A1 | 5/2016 | Kim |
| 2016/0165157 A1 | 6/2016 | Stein |
| 2016/0210528 A1 | 7/2016 | Duan |
| 2016/0313446 A1* | 10/2016 | Fu .......................... G01S 17/89 |
| 2017/0186175 A1* | 6/2017 | Kumeno ................ G06T 7/60 |
| 2017/0243367 A1* | 8/2017 | Lee ....................... G06T 7/70 |
| 2017/0256033 A1* | 9/2017 | Tuzel ..................... G06T 5/00 |

FOREIGN PATENT DOCUMENTS

| | | |
|---|---|---|
| EP | 2463843 A2 | 6/2012 |
| EP | 2463843 A3 | 7/2013 |
| EP | 2761249 A1 | 8/2014 |
| EP | 2463843 B1 | 7/2015 |
| EP | 2448251 A3 | 10/2015 |
| EP | 2946336 A2 | 11/2015 |
| EP | 2993654 A1 | 3/2016 |
| EP | 3081419 A1 | 10/2016 |
| WO | WO/2005/098739 A1 | 10/2005 |
| WO | WO/2005/098751 A1 | 10/2005 |
| WO | WO/2005/098782 | 10/2005 |
| WO | WO/2010/109419 A1 | 9/2010 |
| WO | WO/2013/045612 | 4/2013 |
| WO | WO/2014/111814 A2 | 7/2014 |
| WO | WO/2014/111814 A3 | 7/2014 |
| WO | WO/2014/201324 | 12/2014 |
| WO | WO/2015/083009 | 6/2015 |
| WO | WO/2015/103159 A1 | 7/2015 |
| WO | WO/2015/125022 | 8/2015 |
| WO | WO/2015/186002 A2 | 12/2015 |
| WO | WO/2015/186002 A3 | 12/2015 |
| WO | WO/2016/135736 | 9/2016 |
| WO | WO/2017/013875 A1 | 1/2017 |

OTHER PUBLICATIONS

Hou, Xiaodi and Harel, Jonathan and Koch, Christof, "Image Signature: Highlighting Sparse Salient Regions", IEEE Transactions on Pattern Analysis and Machine Intelligence, vol. 34, No. 1, pp. 194-201, 2012.

Hou, Xiaodi and Zhang, Liqing, "Dynamic Visual Attention: Searching for Coding Length Increments", Advances in Neural Information Processing Systems, vol. 21, pp. 681-688, 2008.

Li, Yin and Hou, Xiaodi and Koch, Christof and Rehg, James M. and Yuille, Alan L., "The Secrets of Salient Object Segmentation", Proceedings of the IEEE Conference on Computer Vision and Pattern Recognition, pp. 280-287, 2014.

Zhou, Bolei and Hou, Xiaodi and Zhang, Liqing, "A Phase Discrepancy Analysis of Object Motion", Asian Conference on Computer Vision, pp. 225-238, Springer Berlin Heidelberg, 2010.

Hou, Xiaodi and Yuille, Alan and Koch, Christof, "Boundary Detection Benchmarking: Beyond F-Measures", Computer Vision and Pattern Recognition, CVPR'13, vol. 2013, pp. 1-8, IEEE, 2013.

Hou, Xiaodi and Zhang, Liqing, "Color Conceptualization", Proceedings of the 15th ACM International Conference on Multimedia, pp. 265-268, ACM, 2007.

Hou, Xiaodi and Zhang, Liqing, "Thumbnail Generation Based on Global Saliency", Advances in Cognitive Neurodynamics, ICCN 2007, pp. 999-1003, Springer Netherlands, 2008.

Hou, Xiaodi and Yuille, Alan and Koch, Christof, "A Meta-Theory of Boundary Detection Benchmarks", arXiv preprint arXiv:1302.5985, 2013.

Li, Yanghao and Wang, Naiyan and Shi, Jianping and Liu, Jiaying and Hou, Xiaodi, "Revisiting Batch Normalization for Practical Domain Adaptation", arXiv preprint arXiv:1603.04779, 2016.

Li, Yanghao and Wang, Naiyan and Liu, Jiaying and Hou, Xiaodi, "Demystifying Neural Style Transfer", arXiv preprint arXiv:1701.01036, 2017.

Hou, Xiaodi and Zhang, Liqing, "A Time-Dependent Model of Information Capacity of Visual Attention", International Conference on Neural Information Processing, pp. 127-136, Springer Berlin Heidelberg, 2006.

Wang, Panqu and Chen, Pengfei and Yuan, Ye and Liu, Ding and Huang, Zehua and Hou, Xiaodi and Cottrell, Garrison, "Understanding Convolution for Semantic Segmentation", arXiv preprint arXiv:1702.08502, 2017.

Li, Yanghao and Wang, Naiyan and Liu, Jiaying and Hou, Xiaodi, "Factorized Bilinear Models for Image Recognition", arXiv preprint arXiv:1611.05709, 2016.

(56) References Cited

OTHER PUBLICATIONS

Hou, Xiaodi, "Computational Modeling and Psychophysics in Low and Mid-Level Vision", California Institute of Technology, 2014.
Spinello, Luciano, Triebel, Rudolph, Siegwart, Roland, "Multiclass Multimodal Detection and Tracking in Urban Environments", Sage Journals, vol. 29 issue: 12, pp. 1498-1515 Article first published online: Oct. 7, 2010;Issue published: Oct. 1, 2010.
Ramos, Sebastian, Gehrig, Stefan, Pinggera, Peter, Franke, Uwe, Rother, Carsten, "Detecting Unexpected Obstacles for Self-Driving Cars: Fusing Deep Learning and Geometric Modeling", arXiv:1612.06573v1 [cs.CV] Dec. 20, 2016.
Schroff, Florian, Dmitry Kalenichenko, James Philbin, (Google), "FaceNet: A Unified Embedding for Face Recognition and Clustering", CVPR 2015.
Dai, Jifeng, Kaiming He, Jian Sun, (Microsoft Research), "Instance-aware Semantic Segmentation via Multi-task Network Cascades", CVPR 2016.
Huval, Brody, Tao Wang, Sameep Tandon, Jeff Kiske, Will Song, Joel Pazhayampallil, Mykhaylo Andriluka, Pranav Rajpurkar, Toki Migimatsu, Royce Cheng-Yue, Fernando Mujica, Adam Coates, Andrew Y. Ng, "An Empirical Evaluation of Deep Learning on Highway Driving", arXiv:1504.01716v3 [cs.RO] Apr. 17, 2015.
Tian Li, "Proposal Free Instance Segmentation Based on Instance-aware Metric", Department of Computer Science, Cranberry-Lemon University, Pittsburgh, PA., date unknown.
Mohammad Norouzi, David J. Fleet, Ruslan Salakhutdinov, "Hamming Distance Metric Learning", Departments of Computer Science and Statistics, University of Toronto, date unknown.

\* cited by examiner

Architecture of ResNet-101 network with Dense Upsampling Convolution (DUC) layer.

SYSTEM AND METHOD FOR OCCLUDING CONTOUR DETECTION

PRIORITY PATENT APPLICATION

This is a continuation-in-part (CIP) patent application drawing priority from U.S. non-provisional patent application Ser. No. 15/456,219; filed Mar. 10, 2017. This present non-provisional CIP patent application draws priority from the referenced patent application. The entire disclosure of the referenced patent application is considered part of the disclosure of the present application and is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2016-2017, TuSimple, All Rights Reserved.

TECHNICAL FIELD

This patent document pertains generally to tools (systems, apparatuses, methodologies, computer program products, etc.) for image processing, vehicle control systems, and autonomous driving systems, and more particularly, but not by way of limitation, to a system and method for occluding contour detection.

BACKGROUND

Semantic segmentation aims to assign a categorical label to every pixel in an image, which plays an important role in image analysis and self-driving systems. Conventional systems use processes including: Decoding of Feature Representation and Dilated Convolution. In the pixel-wise semantic segmentation task with a decoding of feature representation, the output label map typically has the same size as the input image. Because of the operation of max-pooling or strided convolution in convolutional neural networks (CNNs), the size of feature maps of the last few layers of the network are inevitably downsampled. Multiple approaches have been proposed to decode accurate information from the downsampled feature map to label maps. Bilinear interpolation is commonly used as it is fast and memory efficient. Another popular method is called deconvolution, in which the unpooling operation, using stored pooling switches from the pooling step, recovers the information necessary for image reconstruction and feature visualization. In some implementations, a single deconvolutional layer is added in the decoding stage to produce the prediction result using stacked feature maps from intermediate layers. In other implementations, multiple deconvolutional layers are applied to generate chairs, tables, or cars from several attributes. Several studies employ deconvolutional layers as a mirrored version of convolutional layers by using stored pooled location in unpooling step. Other studies show that coarse-to-fine object structures, which are crucial to recover fine-detailed information, can be reconstructed along the propagation of the deconvolutional layers. Other systems use a similar mirrored structure, but combine information from multiple deconvolutional layers and perform upsampling to make the final prediction. Some systems predict the label map by applying a classifier on a per-pixel basis, as it is more statistically efficient.

Dilated Convolution (or Atrous convolution) was originally developed for wavelet decomposition. The main idea of dilated convolution is to insert "holes" (zeros) between pixels in convolutional kernels to increase image resolution, thus enabling dense feature extraction in deep CNNs. In the semantic segmentation framework, dilated convolution is also used to enlarge the field of convolutional kernels. Some prior systems use serialized layers with increasing rates of dilation to enable context aggregation, while designing an "atrous spatial pyramid pooling (ASPP)" scheme to capture multi-scale objects and context information by placing multiple dilated convolution layers in parallel. More recently, dilated convolution has been applied to a broader range of tasks, such as object detection optical flow, visual question answering, and audio generation. However, these conventional systems can cause a "gridding issue" produced by the standard dilated convolution operation. Other conventional systems lose information in the downsampling process and thus fail to enable identification of important objects in the input image.

Object contour detection is a fundamental problem for numerous vision tasks, including image segmentation, object detection, semantic instance segmentation, and occlusion reasoning. Detecting all objects in a traffic environment, such as cars, buses, pedestrians, and bicycles, is crucial for building an autonomous driving system. Failure to detect an object (e.g., a car or a person) may lead to malfunction of the motion planning module of an autonomous driving car, thus resulting in a catastrophic accident. The semantic segmentation framework provides pixel-level categorical labeling, but no single object-level instance can be discovered. Current object detection frameworks, although useful, cannot recover the shape of the object or deal with the occluded object detection problem. This is mainly because of the limits of the bounding box merging process in the conventional framework. In particular, problems occur when nearby bounding boxes that may belong to different objects get merged together to reduce a false positive rate, thus making the occluded object undetected, especially when the occluded region is large.

SUMMARY

Recent advances in deep learning, especially deep convolutional neural networks (CNNs), have led to significant improvement over previous semantic segmentation systems. In the various example embodiments described herein, we improve pixel-wise semantic segmentation by manipulating convolution-related operations that are better for practical use. First, we implement dense upsampling convolution (DUC) to generate pixel-level prediction, which is able to capture and decode more detailed information that is generally missing in bilinear upsampling. Second, we implement a hybrid dilated convolution (HDC) framework in the encoding phase. This framework: 1) effectively enlarges the receptive fields of the network to aggregate global information; and 2) alleviates a "gridding issue" caused by the standard dilated convolution operation.

In various example embodiments disclosed herein, occluding contour detection is achieved using a contour-detection based approach. Because the global object contour defines both edge and shape information of an object, the contour enables analysis of the region of interest inside the contour at a finer level, which is more accurate than the bounding box obtained from object detection, or the categorical label map obtained from semantic segmentation, where single object-level information is neglected. More importantly, accurate object contours can help us solve a fundamental problem, that is, occluded object detection in an object detection framework, where occluded objects are usually neglected after the bounding box merging process. In example embodiments disclosed herein, we formulate the contour detection problem as an image labeling task that naturally fits into the semantic segmentation framework. By training a fully convolutional network (FCN) end-to-end using Dense Upsampling Convolution (DUC), as described herein, and weighted multi-logistic loss, the disclosed embodiments can effectively detect object-level contours of traffic participants in a traffic environment, and solve the occluded object detection problem.

BRIEF DESCRIPTION OF THE DRAWINGS

The various embodiments are illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As described in various example embodiments, a system and method for occluding contour detection are described herein. An example embodiment disclosed herein can be used in the context of an in-vehicle control system 150 in a vehicle ecosystem 101. In one example embodiment, an in-vehicle control system 150 with an image processing module 200 resident in a vehicle 105 can be configured like the architecture and ecosystem 101 illustrated in FIG. 1. However, it will be apparent to those of ordinary skill in the art that the image processing module 200 described and claimed herein can be implemented, configured, and used in a variety of other applications and systems as well.

Figure 1:
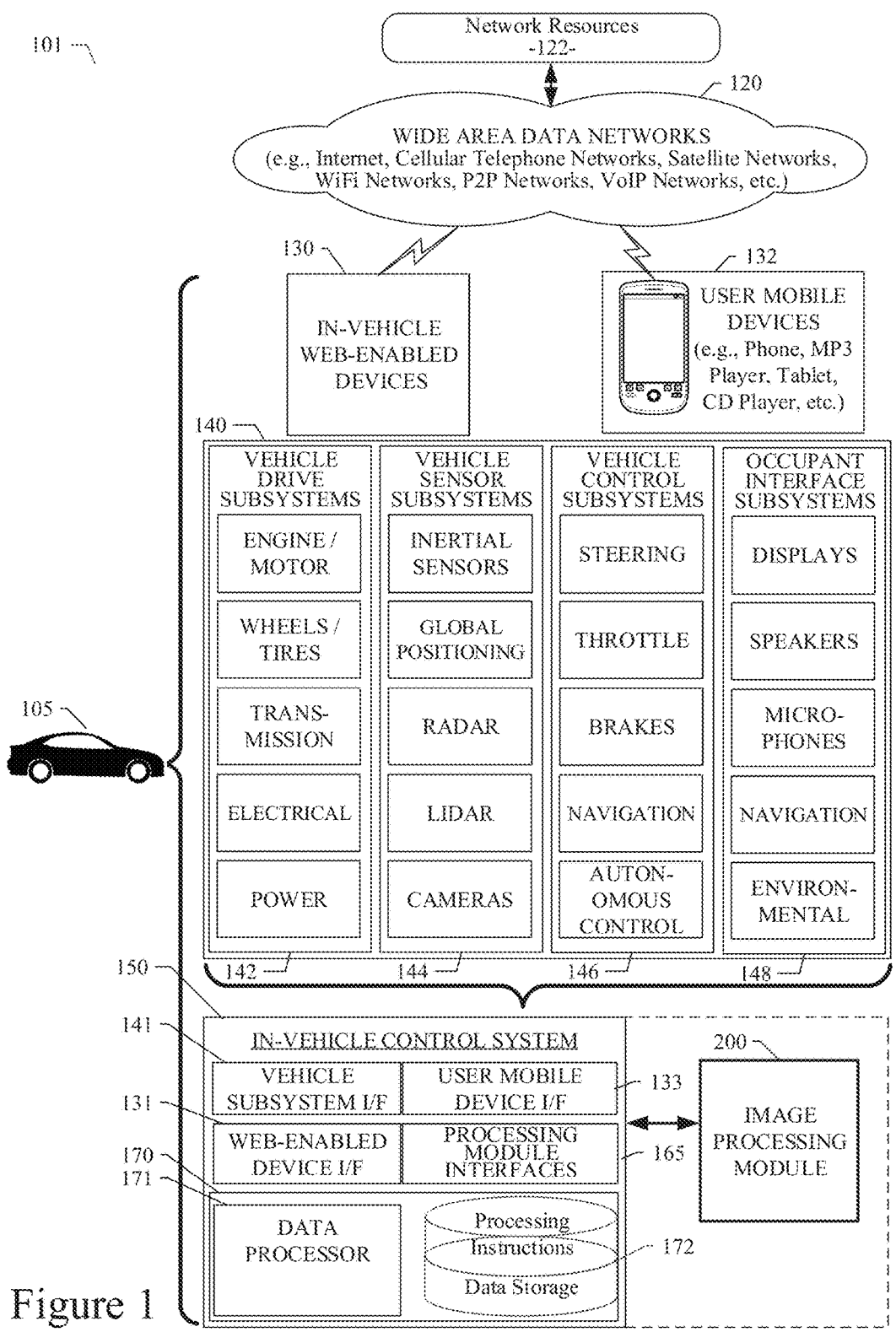
FIG. 1 illustrates a block diagram of an example ecosystem in which an in-vehicle image processing module of an example embodiment can be implemented.

Referring now to FIG. 1, a block diagram illustrates an example ecosystem 101 in which an in-vehicle control system 150 and an image processing module 200 of an example embodiment can be implemented. These components are described in more detail below. Ecosystem 101 includes a variety of systems and components that can generate and/or deliver one or more sources of information/data and related services to the in-vehicle control system 150 and the image processing module 200, which can be installed in the vehicle 105. For example, a camera installed in the vehicle 105, as one of the devices of vehicle subsystems 140, can generate image and timing data that can be received by the in-vehicle control system 150. The in-vehicle control system 150 and the image processing module 200 executing therein can receive this image and timing data input. As described in more detail below, the image processing module 200 can process the image input and generate a semantic label map, which can be used by an autonomous vehicle control subsystem, as another one of the subsystems of vehicle subsystems 140. The autonomous vehicle control subsystem, for example, can use the real-time generated semantic label map to safely and efficiently navigate and control the vehicle 105 through a real world driving environment while avoiding obstacles and safely controlling the vehicle.

In an example embodiment as described herein, the in-vehicle control system 150 can be in data communication with a plurality of vehicle subsystems 140, all of which can be resident in a user's vehicle 105. A vehicle subsystem interface 141 is provided to facilitate data communication between the in-vehicle control system 150 and the plurality of vehicle subsystems 140. The in-vehicle control system 150 can be configured to include a data processor 171 to execute the image processing module 200 for processing image data received from one or more of the vehicle subsystems 140. The data processor 171 can be combined with a data storage device 172 as part of a computing system 170 in the in-vehicle control system 150. The data storage device 172 can be used to store data, processing parameters, and data processing instructions. A processing module interface 165 can be provided to facilitate data communications between the data processor 171 and the image processing module 200. In various example embodiments, a plurality of processing modules, configured similarly to image processing module 200, can be provided for execution by data processor 171. As shown by the dashed lines in FIG. 1, the image processing module 200 can be integrated into the in-vehicle control system 150, optionally downloaded to the in-vehicle control system 150, or deployed separately from the in-vehicle control system 150.

The in-vehicle control system 150 can be configured to receive or transmit data from/to a wide-area network 120 and network resources 122 connected thereto. An in-vehicle web-enabled device 130 and/or a user mobile device 132 can be used to communicate via network 120. A web-enabled device interface 131 can be used by the in-vehicle control system 150 to facilitate data communication between the in-vehicle control system 150 and the network 120 via the in-vehicle web-enabled device 130. Similarly, a user mobile device interface 133 can be used by the in-vehicle control system 150 to facilitate data communication between the in-vehicle control system 150 and the network 120 via the user mobile device 132. In this manner, the in-vehicle control system 150 can obtain real-time access to network resources 122 via network 120. The network resources 122 can be used to obtain processing modules for execution by data processor 171, data content to train internal neural networks, system parameters, or other data.

The ecosystem 101 can include a wide area data network 120. The network 120 represents one or more conventional wide area data networks, such as the Internet, a cellular telephone network, satellite network, pager network, a wireless broadcast network, gaming network, WiFi network, peer-to-peer network, Voice over IP (VoIP) network, etc. One or more of these networks 120 can be used to connect a user or client system with network resources 122, such as websites, servers, central control sites, or the like. The network resources 122 can generate and/or distribute data, which can be received in vehicle 105 via in-vehicle web-enabled devices 130 or user mobile devices 132. The network resources 122 can also host network cloud services, which can support the functionality used to compute or assist in processing image input or image input analysis. Antennas can serve to connect the in-vehicle control system 150 and the image processing module 200 with the data network 120 via cellular, satellite, radio, or other conventional signal reception mechanisms. Such cellular data networks are currently available (e.g., Verizon™, AT&T™, T-Mobile™, etc.). Such satellite-based data or content networks are also currently available (e.g., SiriusXM™, HughesNet™, etc.). The conventional broadcast networks, such as AM/FM radio networks, pager networks, UHF networks, gaming networks, WiFi networks, peer-to-peer networks, Voice over IP (VoIP) networks, and the like are also well-known. Thus, as described in more detail below, the in-vehicle control system 150 and the image processing module 200 can receive web-based data or content via an in-vehicle web-enabled device interface 131, which can be used to connect with the in-vehicle web-enabled device receiver 130 and network 120. In this manner, the in-vehicle control system 150 and the image processing module 200 can support a variety of network-connectable in-vehicle devices and systems from within a vehicle 105.

As shown in FIG. 1, the in-vehicle control system 150 and the image processing module 200 can also receive data, image processing control parameters, and training content from user mobile devices 132, which can be located inside or proximately to the vehicle 105. The user mobile devices 132 can represent standard mobile devices, such as cellular phones, smartphones, personal digital assistants (PDA's), MP3 players, tablet computing devices (e.g., iPad™), laptop computers, CD players, and other mobile devices, which can produce, receive, and/or deliver data, image processing control parameters, and content for the in-vehicle control system 150 and the image processing module 200. As shown in FIG. 1, the mobile devices 132 can also be in data communication with the network cloud 120. The mobile devices 132 can source data and content from internal memory components of the mobile devices 132 themselves or from network resources 122 via network 120. Additionally, mobile devices 132 can themselves include a GPS data receiver, accelerometers, WiFi triangulation, or other geo-location sensors or components in the mobile device, which can be used to determine the real-time geo-location of the user (via the mobile device) at any moment in time. In any case, the in-vehicle control system 150 and the image processing module 200 can receive data from the mobile devices 132 as shown in FIG. 1.

Referring still to FIG. 1, the example embodiment of ecosystem 101 can include vehicle operational subsystems 140. For embodiments that are implemented in a vehicle 105, many standard vehicles include operational subsystems, such as electronic control units (ECUs), supporting monitoring/control subsystems for the engine, brakes, transmission, electrical system, emissions system, interior environment, and the like. For example, data signals communicated from the vehicle operational subsystems 140 (e.g., ECUs of the vehicle 105) to the in-vehicle control system 150 via vehicle subsystem interface 141 may include information about the state of one or more of the components or subsystems of the vehicle 105. In particular, the data signals, which can be communicated from the vehicle operational subsystems 140 to a Controller Area Network (CAN) bus of the vehicle 105, can be received and processed by the in-vehicle control system 150 via vehicle subsystem interface 141. Embodiments of the systems and methods described herein can be used with substantially any mechanized system that uses a CAN bus or similar data communications bus as defined herein, including, but not limited to, industrial equipment, boats, trucks, machinery, or automobiles; thus, the term "vehicle" as used herein can include any such mechanized systems. Embodiments of the systems and methods described herein can also be used with any systems employing some form of network data communications; however, such network communications are not required.

Referring still to FIG. 1, the example embodiment of ecosystem 101, and the vehicle operational subsystems 140 therein, can include a variety of vehicle subsystems in support of the operation of vehicle 105. In general, the vehicle 105 may take the form of a car, truck, motorcycle, bus, boat, airplane, helicopter, lawn mower, earth mover, snowmobile, aircraft, recreational vehicle, amusement park vehicle, farm equipment, construction equipment, tram, golf cart, train, and trolley, for example. Other vehicles are possible as well. The vehicle 105 may be configured to operate fully or partially in an autonomous mode. For example, the vehicle 105 may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle 105 based on the determined information. While in autonomous mode, the vehicle 105 may be configured to operate without human interaction.

The vehicle 105 may include various vehicle subsystems such as a vehicle drive subsystem 142, vehicle sensor subsystem 144, vehicle control subsystem 146, and occupant interface subsystem 148. As described above, the vehicle 105 may also include the in-vehicle control system 150, the computing system 170, and the image processing module 200. The vehicle 105 may include more or fewer subsystems and each subsystem could include multiple elements. Further, each of the subsystems and elements of vehicle 105 could be interconnected. Thus, one or more of the described functions of the vehicle 105 may be divided up into additional functional or physical components or combined into fewer functional or physical components. In some further examples, additional functional and physical components may be added to the examples illustrated by FIG. 1.

The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source. The engine or motor may be any combination of an internal combustion engine, an electric motor, steam engine, fuel cell engine, propane engine, or other types of engines or motors. In some example embodiments, the engine may be configured to convert a power source into mechanical energy. In some example embodiments, the vehicle drive subsystem 142 may include multiple types of engines or motors. For instance, a gas-electric hybrid car could include a gasoline engine and an electric motor. Other examples are possible.

The wheels of the vehicle 105 may be standard tires. The wheels of the vehicle 105 may be configured in various formats, including a unicycle, bicycle, tricycle, or a four-wheel format, such as on a car or a truck, for example. Other wheel geometries are possible, such as those including six or more wheels. Any combination of the wheels of vehicle 105 may be operable to rotate differentially with respect to other wheels. The wheels may represent at least one wheel that is fixedly attached to the transmission and at least one tire coupled to a rim of the wheel that could make contact with the driving surface. The wheels may include a combination of metal and rubber, or another combination of materials. The transmission may include elements that are operable to transmit mechanical power from the engine to the wheels. For this purpose, the transmission could include a gearbox, a clutch, a differential, and drive shafts. The transmission may include other elements as well. The drive shafts may include one or more axles that could be coupled to one or more wheels. The electrical system may include elements that are operable to transfer and control electrical signals in the vehicle 105. These electrical signals can be used to activate lights, servos, electrical motors, and other electrically driven or controlled devices of the vehicle 105. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle 105.

The vehicle sensor subsystem 144 may include a number of sensors configured to sense information about an environment or condition of the vehicle 105. For example, the vehicle sensor subsystem 144 may include an inertial measurement unit (IMU), a Global Positioning System (GPS) transceiver, a RADAR unit, a laser range finder/LIDAR unit, and one or more cameras or image capture devices. The vehicle sensor subsystem 144 may also include sensors configured to monitor internal systems of the vehicle 105 (e.g., an O2 monitor, a fuel gauge, an engine oil temperature). Other sensors are possible as well. One or more of the sensors included in the vehicle sensor subsystem 144 may be configured to be actuated separately or collectively in order to modify a position, an orientation, or both, of the one or more sensors.

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. In an example embodiment, the laser range finder/LIDAR unit may include one or more laser sources, a laser scanner, and one or more detectors, among other system components. The laser range finder/LIDAR unit could be configured to operate in a coherent (e.g., using heterodyne detection) or an incoherent detection mode. The cameras may include one or more devices configured to capture a plurality of images of the environment of the vehicle 105. The cameras may be still image cameras or motion video cameras.

The vehicle control system 146 may be configured to control operation of the vehicle 105 and its components. Accordingly, the vehicle control system 146 may include various elements such as a steering unit, a throttle, a brake unit, a navigation unit, and an autonomous control unit.

The steering unit may represent any combination of mechanisms that may be operable to adjust the heading of vehicle 105. The throttle may be configured to control, for instance, the operating speed of the engine and, in turn, control the speed of the vehicle 105. The brake unit can include any combination of mechanisms configured to decelerate the vehicle 105. The brake unit can use friction to slow the wheels in a standard manner. In other embodiments, the brake unit may convert the kinetic energy of the wheels to electric current. The brake unit may take other forms as well. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the image processing module 200, the GPS transceiver, and one or more predetermined maps so as to determine the driving path for the vehicle 105. The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the image processing module 200, the GPS transceiver, the RADAR, the LIDAR, the cameras, and other vehicle subsystems to determine the driving path or trajectory for the vehicle 105. The vehicle control system 146 may additionally or alternatively include components other than those shown and described.

Occupant interface subsystems 148 may be configured to allow interaction between vehicle 105 and external sensors, other vehicles, other computer systems, and/or an occupant or user of vehicle 105. For example, the occupant interface subsystems 148 may include standard visual display devices (e.g., plasma displays, liquid crystal displays (LCDs), touchscreen displays, heads-up displays, or the like), speakers or other audio output devices, microphones or other audio input devices, navigation interfaces, and interfaces for controlling the internal environment (e.g., temperature, fan, etc.) of the vehicle 105.

In an example embodiment, the occupant interface subsystems 148 may provide, for instance, means for a user/occupant of the vehicle 105 to interact with the other vehicle subsystems. The visual display devices may provide information to a user of the vehicle 105. The user interface devices can also be operable to accept input from the user via a touchscreen. The touchscreen may be configured to sense at least one of a position and a movement of a user's finger via capacitive sensing, resistance sensing, or a surface acoustic wave process, among other possibilities. The touchscreen may be capable of sensing finger movement in a direction parallel or planar to the touchscreen surface, in a direction normal to the touchscreen surface, or both, and may also be capable of sensing a level of pressure applied to the touchscreen surface. The touchscreen may be formed of one or more translucent or transparent insulating layers and one or more translucent or transparent conducting layers. The touchscreen may take other forms as well.

In other instances, the occupant interface subsystems 148 may provide means for the vehicle 105 to communicate with devices within its environment. The microphone may be configured to receive audio (e.g., a voice command or other audio input) from a user of the vehicle 105. Similarly, the speakers may be configured to output audio to a user of the vehicle 105. In one example embodiment, the occupant interface subsystems 148 may be configured to wirelessly communicate with one or more devices directly or via a communication network. For example, a wireless communication system could use 3G cellular communication, such as CDMA, EVDO, GSM/GPRS, or 4G cellular communication, such as WiMAX or LTE. Alternatively, the wireless communication system may communicate with a wireless local area network (WLAN), for example, using WIFI®. In some embodiments, the wireless communication system 146 may communicate directly with a device, for example, using an infrared link, BLUETOOTH®, or ZIGBEE®. Other wireless protocols, such as various vehicular communication systems, are possible within the context of the disclosure. For example, the wireless communication system may include one or more dedicated short range communications (DSRC) devices that may include public or private data communications between vehicles and/or roadside stations.

Many or all of the functions of the vehicle 105 can be controlled by the computing system 170. The computing system 170 may include at least one data processor 171 (which can include at least one microprocessor) that executes processing instructions stored in a non-transitory computer readable medium, such as the data storage device 172. The computing system 170 may also represent a plurality of computing devices that may serve to control individual components or subsystems of the vehicle 105 in a distributed fashion. In some embodiments, the data storage device 172 may contain processing instructions (e.g., program logic) executable by the data processor 171 to perform various functions of the vehicle 105, including those described herein in connection with the drawings. The data storage device 172 may contain additional instructions as well, including instructions to transmit data to, receive data from, interact with, or control one or more of the vehicle drive subsystem 142, the vehicle sensor subsystem 144, the vehicle control subsystem 146, and the occupant interface subsystems 148.

In addition to the processing instructions, the data storage device 172 may store data such as image processing parameters, training data, roadway maps, and path information, among other information. Such information may be used by the vehicle 105 and the computing system 170 during the operation of the vehicle 105 in the autonomous, semi-autonomous, and/or manual modes.

The vehicle 105 may include a user interface for providing information to or receiving input from a user or occupant of the vehicle 105. The user interface may control or enable control of the content and the layout of interactive images that may be displayed on a display device. Further, the user interface may include one or more input/output devices within the set of occupant interface subsystems 148, such as the display device, the speakers, the microphones, or a wireless communication system.

The computing system 170 may control the function of the vehicle 105 based on inputs received from various vehicle subsystems (e.g., the vehicle drive subsystem 142, the vehicle sensor subsystem 144, and the vehicle control subsystem 146), as well as from the occupant interface subsystem 148. For example, the computing system 170 may use input from the vehicle control system 146 in order to control the steering unit to avoid an obstacle detected by vehicle sensor subsystem 144 and the image processing module 200, move in a controlled manner, or follow a path or trajectory based on output generated by the image processing module 200. In an example embodiment, the computing system 170 can be operable to provide control over many aspects of the vehicle 105 and its subsystems.

Although FIG. 1 shows various components of vehicle 105, e.g., vehicle subsystems 140, computing system 170, data storage device 172, and image processing module 200, as being integrated into the vehicle 105, one or more of these components could be mounted or associated separately from the vehicle 105. For example, data storage device 172 could, in part or in full, exist separate from the vehicle 105. Thus, the vehicle 105 could be provided in the form of device elements that may be located separately or together. The device elements that make up vehicle 105 could be communicatively coupled together in a wired or wireless fashion.

Additionally, other data and/or content (denoted herein as ancillary data) can be obtained from local and/or remote sources by the in-vehicle control system 150 as described above. The ancillary data can be used to augment, modify, or train the operation of the image processing module 200 based on a variety of factors including, the context in which the user is operating the vehicle (e.g., the location of the vehicle, the specified destination, direction of travel, speed, the time of day, the status of the vehicle, etc.), and a variety of other data obtainable from the variety of sources, local and remote, as described herein.

In a particular embodiment, the in-vehicle control system 150 and the image processing module 200 can be implemented as in-vehicle components of vehicle 105. In various example embodiments, the in-vehicle control system 150 and the image processing module 200 in data communication therewith can be implemented as integrated components or as separate components. In an example embodiment, the software components of the in-vehicle control system 150 and/or the image processing module 200 can be dynamically upgraded, modified, and/or augmented by use of the data connection with the mobile devices 132 and/or the network resources 122 via network 120. The in-vehicle control system 150 can periodically query a mobile device 132 or a network resource 122 for updates or updates can be pushed to the in-vehicle control system 150.

Figure 2:
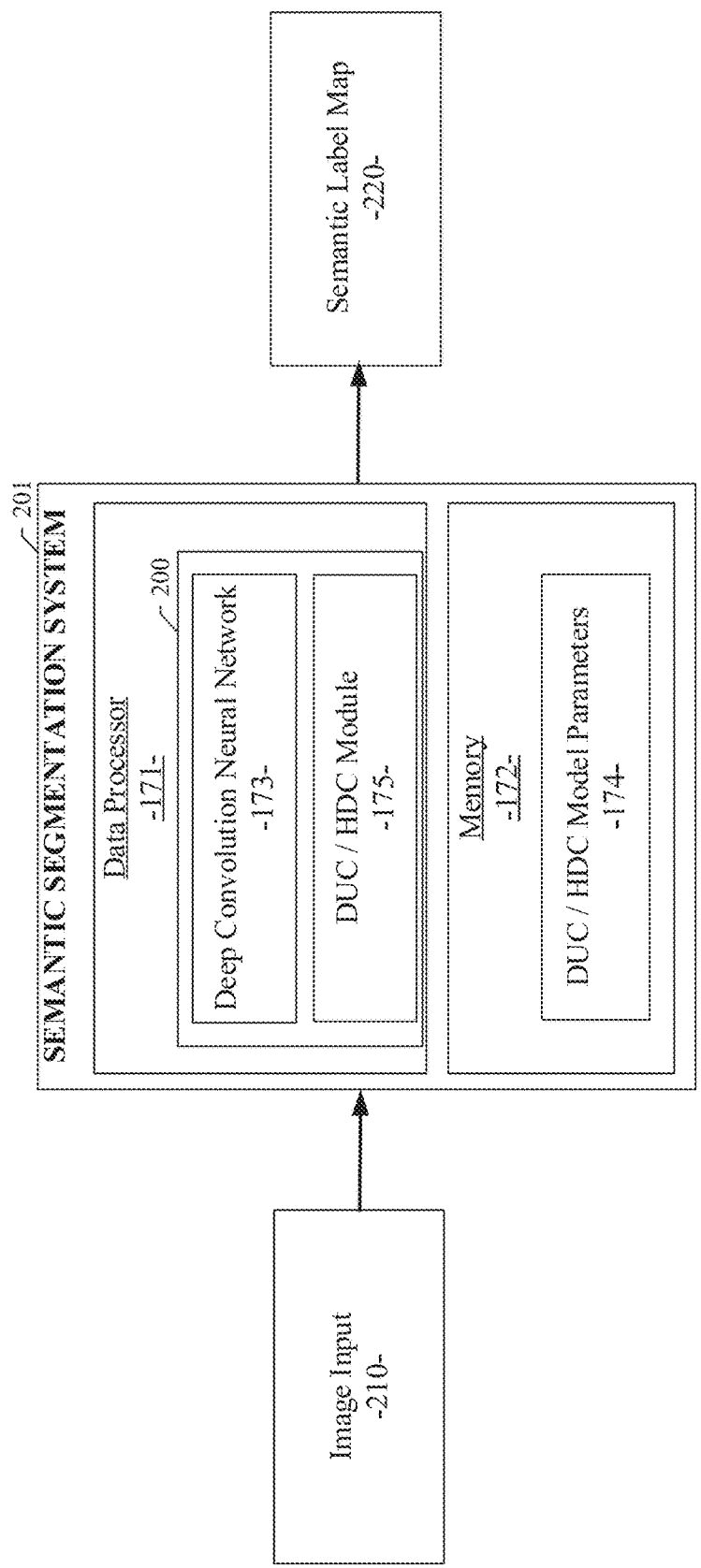
FIG. 2 illustrates the components of the in-vehicle image processing module of an example embodiment.

Referring now to FIG. 2, a diagram illustrates the components of the image processing module 200 of an example embodiment. In the example embodiment, the image processing module 200 can be configured to include a deep convolutional neural network 173 and a dense upsampling convolution (DUC) and Hybrid Dilated Convolution (HDC) module 175. As described in more detail below, the deep convolutional neural network 173 and the DUC/HDC module 175 serve to provide pixel-level semantic segmentation of an input image 210 received from one or more of the vehicle sensor subsystems 144, including one or more cameras. The deep convolutional neural network 173 and DUC/HDC module 175 can be configured as software modules executed by the data processor 171 of the in-vehicle control system 150. The modules 173 and 175 of the image processing module 200 can receive the image input 210 and produce a semantic label map 220, which can assign a pixel-level categorical label to every object in the input image. As a result, the autonomous control subsystem of the vehicle control subsystem 146 can more efficiently and safely control the vehicle 105. As part of their image processing, the deep convolutional neural network 173 and DUC/HDC module 175 can be configured to work with model parameters 174, which can be used to customize and fine tune the operation of the image processing module 200. The DUC/HDC model parameters 174 can be stored in a memory 172 of the in-vehicle control system 150.

In the example embodiment, the image processing module 200 can be configured to include an interface with the in-vehicle control system 150, as shown in FIG. 1, through which the image processing module 200 can send and receive data as described herein. Additionally, the image processing module 200 can be configured to include an interface with the in-vehicle control system 150 and/or other ecosystem 101 subsystems through which the image processing module 200 can receive ancillary data from the various data sources described above. As described above, the image processing module 200 can also be implemented in systems and platforms that are not deployed in a vehicle and not necessarily used in or with a vehicle.

In an example embodiment as shown in FIG. 2, the image processing module 200 can be configured to include the deep convolutional neural network 173 and DUC/HDC module 175, as well as other processing modules not shown for clarity. Each of these modules can be implemented as software, firmware, or other logic components executing or activated within an executable environment of the semantic segmentation system 201 operating within or in data communication with the in-vehicle control system 150. Each of these modules of an example embodiment is described in more detail below in connection with the figures provided herein.

System and Method for Semantic Segmentation Using Dense Upsampling Convolution (DUC)

As described above, semantic segmentation aims to assign a categorical label to every pixel in an image, which plays an important role in image understanding and self-driving systems. The recent success of deep convolutional neural network (CNN) models has enabled remarkdble progress in pixel-wise semantic segmentation tasks due to rich hierarchical features and an end-to-end trainable framework. Most state-of-the-art semantic segmentation systems have three key components: 1) a fully convolutional network (FCN), replacing the last few fully connected layers by convolutional layers to make efficient end-to-end learning and inference that can take arbitrary input size; 2) Conditional Random Fields (CRFs), to capture both local and long-range dependencies within an image to refine the prediction map; and 3) dilated convolution (or Atrous convolution), which is used to increase the resolution of intermediate feature maps in order to generate more accurate predictions while maintaining the same computational cost.

Since the introduction of FCN, improvements on fully-supervised semantic segmentation systems are generally focused on two perspectives: First, applying deeper FCN models. Significant gains in mean Intersection-over-Union (mIoU) scores on PASCAL VOC2012 datasets were reported when the 16-layer VGG-16 model was replaced by a 101-layer ResNet-101 model; using a 152 layer ResNet-152 model yields further improvements. This trend is consistent with the performance of these models on ILSVRC object classification tasks, as deeper networks generally can model more complex representations and learn more discriminative features that better distinguish among categories. Second, making CRFs more powerful. This includes applying fully connected pairwise CRFs as a post-processing step integrating CRFs into the network by approximating its mean-field inference steps to enable end-to-end training, and incorporating additional information into CRFs, such as edges and object detections.

The various example embodiments described herein provide improvements on semantic segmentation from another perspective: the convolutional operations for both decoding (from intermediate feature map to output label map) and encoding (from input image to feature map) counterparts. In decoding, most state-of-the-art semantic segmentation systems simply use bilinear upsampling (before the CRF stage) to get the output label map. Bilinear upsampling is not learnable and may lose fine details. The example embodiments described herein implement a method or operation called dense upsampling convolution (DUC), which is extremely easy to implement and can achieve pixel-level accuracy. The DUC processing can be performed by the image processing module 200 as described above. Instead of trying to recover the full-resolution label map at once, the example embodiment learns an array of upscaling filters to upscale the downsized feature maps into the final dense feature map of the desired size. DUC naturally fits the FCN framework by enabling end-to-end training, and it significantly increases the mIOU of pixel-level semantic segmentation on the Cityscapes dataset, for example, especially on objects that are relatively small.

The example embodiments described herein use DUC and Hybrid Dilated Convolution (HDC, described below) to make convolution operations better serve the need of pixel-level semantic segmentation. The technical details are described in more detail below. Combined with post-processing by Conditional Random Fields (CRFs), the example embodiments achieve state-of-the art performance on the Cityscapes pixel-level semantic labeling task, KITTI road estimation benchmark, and the PASCAL VOC2012 segmentation task.

Figure 3:
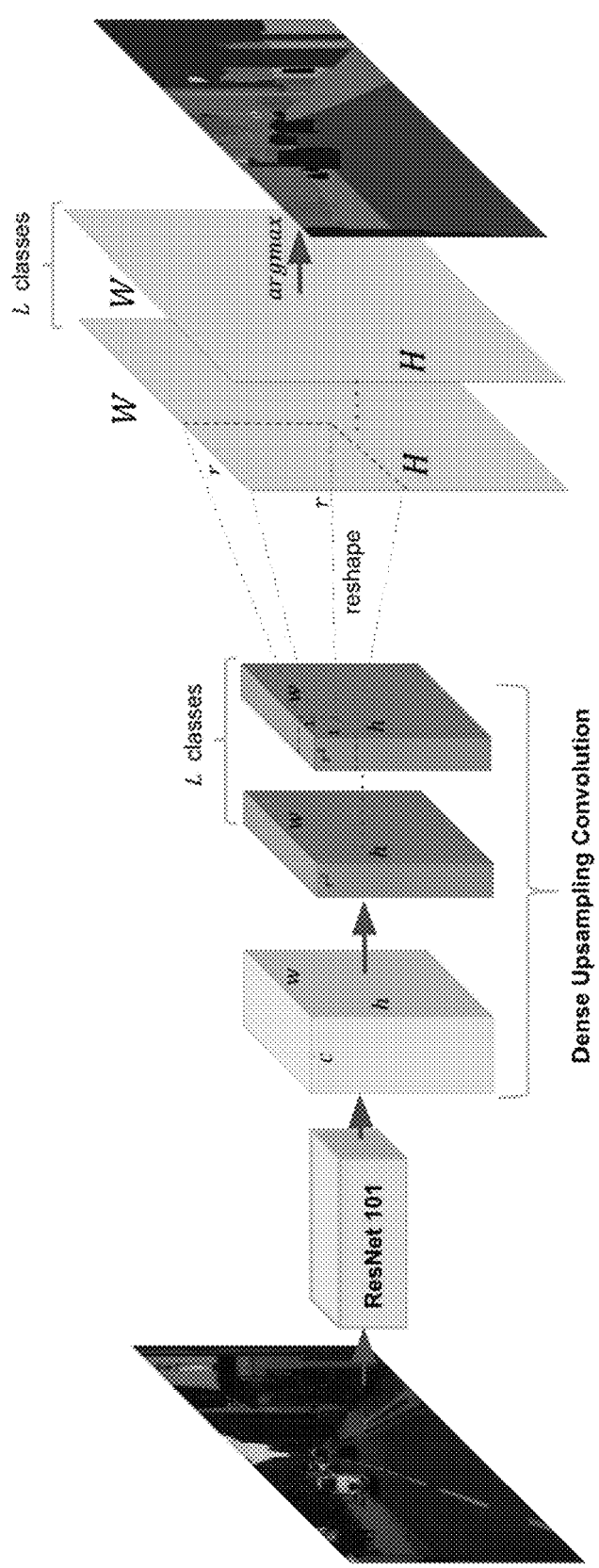
FIG. 3 illustrates an example embodiment of an architecture of a ResNet-101 network with Dense Upsampling Convolution (DUC) layers in a system and method for semantic segmentation using dense upsampling convolution.

In various example embodiments described herein, the image processing module 200 uses DUC to improve pixel-level semantic segmentation. Suppose an input image 210 has height H, width W, and color channels C, and the goal of pixel-level semantic segmentation is to generate a label map 220 with size H×W where each pixel is labeled with a category label. After feeding the image into a deep FCN, a feature map with dimension h×w×c is obtained at the final layer before making predictions, where h=H/r, w=W/r, and r is the downsampling factor. Instead of performing bilinear upsampling, which is not learnable, or deconvolution, in which zeros have to be padded in the unpooling step before the convolution operation, DUC applies convolutional operations directly on the feature maps to get the pixel-wise prediction map. FIG. 3 depicts the architecture of the ResNet-101 network with a DUC layer in an example embodiment.

In DUC, the convolution operation is performed on the feature map from ResNet, of dimension h×w×c to get the output feature map of dimension h×w×($r^2$× L), where L is the total number of classes in the semantic segmentation task. Thus, each layer of the dense convolution is learning the prediction for each pixel. The output feature map is then reshaped to H×W×L (remember h=H/r, w=W/r) with a softmax layer, and an elementwise argmax operator is applied to get the final label map. A key idea of DUC is to divide the whole label map into equal subparts, which have the same height and width as the incoming feature map. All parts are then stacked a total of $r^2$ times to create the whole label map. This is to say, the example embodiment transforms the whole label map into a smaller label map with multiple channels. This transformation allows us to apply the convolution operation directly between the input feature map and the output label maps without the need for inserting extra values in deconvolutional layers (the "unpooling" operation).

Because DUC is learnable, the process is capable of capturing and recovering fine-detailed information that is generally missing in the bilinear interpolation operation. For example, if a network has a downsample rate of 1/16, and an object has a length or width less than 16 pixels (such as a pole or a person far away), then it is more than likely that bilinear upsampling will not be able to recover this object. Meanwhile, the corresponding training labels have to be downsampled to correspond with the output dimension, which will already cause information loss for fine details. The prediction of DUC, on the other hand, is performed at the original resolution, thus enabling pixel-level decoding. In addition, the DUC operation can be naturally integrated into the FCN framework, which makes the whole encoding and decoding process end-to-end trainable.

Figure 5:
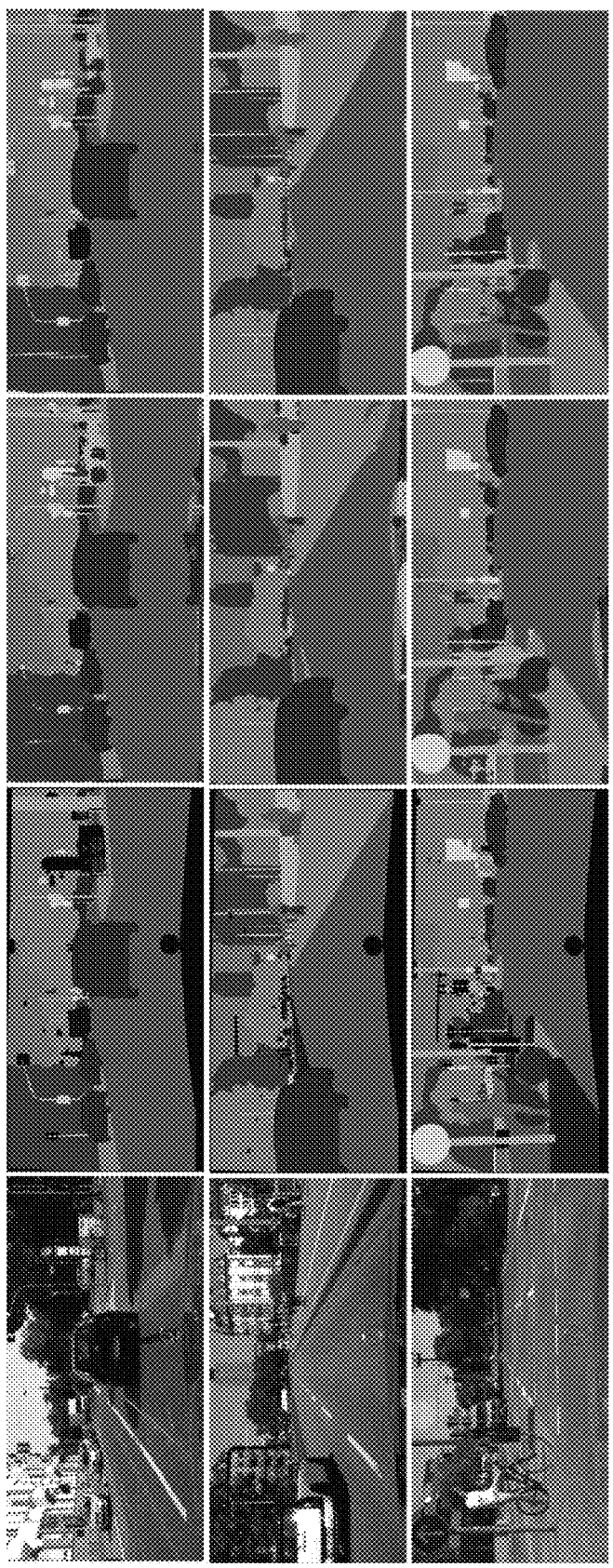
FIG. 5 illustrates an example of the use of the DUC process as described herein.

FIG. 5 illustrates an example of the use of the DUC process as described herein. As shown, the DUC process is very helpful for identifying small objects, such as poles, traffic lights, and traffic signs. Thus, pixel-level dense upsampling can recover detailed information that is generally missed by bilinear interpolation.

System and Method for Semantic Segmentation Using Hybrid Dilated Convolution (HDC)

For the encoding part, dilated convolution recently became popular as it maintains the resolution and receptive field of the network by in inserting "holes" in the convolution kernels, thus eliminating the need for downsampling (by max-pooling or strided convolution). However, an inherent problem exists in the current dilated convolution framework, which we identify as "gridding": as zeros are padded between two pixels in a convolutional kernel, the receptive field of this kernel only covers an area with checkerboard patterns—only locations with non-zero values are sampled, losing some neighboring information. The problem gets worse when the rate of dilation increases, generally in higher layers when the receptive field is large: the convolutional kernel is too sparse to cover any local information, because the non-zero values are too far apart. Information that contributes to a fixed pixel always comes from its predefined gridding pattern, thus losing a huge portion of information. The example embodiments described herein implement a simple hybrid dilation convolution (HDC) framework as a first attempt to address this problem; instead of using the same rate of dilation for the same spatial resolution, the example embodiment uses a range of dilation rates and concatenates them serially the same way as "blocks" in ResNet-101. The HDC processing can be performed by the image processing module 200 as described above. As a result, the HDC processing helps the network to alleviate the gridding problem. Moreover, choosing proper rates can effectively increase the receptive field size and improve the accuracy for objects that are relatively big.

In various example embodiments described herein, the image processing module 200 uses HDC to further improve pixel-level semantic segmentation. For example, a 1-D, dilated convolution can be defined as:

$$g[i] = \sum_{l=1}^{L} f[i + r \cdot l] h[l], \quad (1)$$

where f[i] is the input signal, g[i] is the output signal, h[l] denotes the filter of length L, and r corresponds to the dilation rate used to sample f[i]. In standard convolution, r=1.

In a semantic segmentation system, 2-D dilated convolution is constructed by inserting "holes" (zeros) between each pixel in the convolutional kernel. For a convolution kernel with size k×k, the size of resulting dilated filter is $k_d$× $k_d$, where $k_d$=k+(k−1)·(r−1). Dilated convolution is used to maintain high resolution of feature maps in FCN through replacing the max-pooling operation or strided convolution layer while maintaining the receptive field (or "field of view") of the corresponding layer. For example, if a convolution layer in ResNet-101 has a stride s=2, then the stride is reset to 1 to remove downsampling, and the dilation rate r is set to 2 for all convolution kernels of subsequent layers. This process is applied iteratively through all layers that have a downsampling operation, thus the feature map in the output layer can maintain the same resolution as the input layer. In practice, however, dilated convolution is generally applied on feature maps that are already downsampled to achieve a reasonable efficiency/accuracy trade-off.

Figure 4:
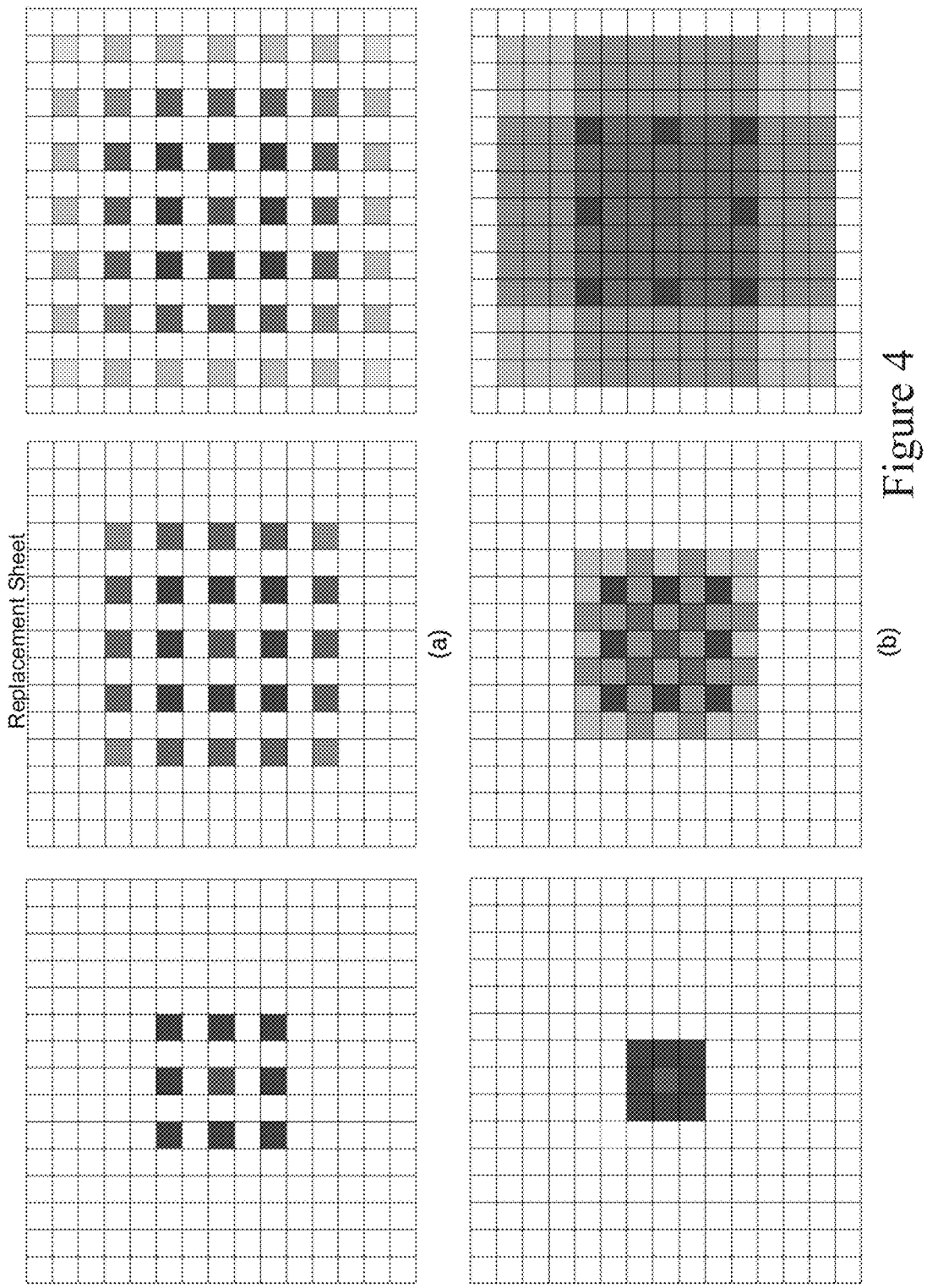
FIG. 4 illustrates an example of a problem denoted as "gridding"

However, one problem exists in the above-described dilated convolution framework, the problem being denoted as "gridding." As example of gridding is shown in FIG. 4. As shown in FIG. 4 from left to right, the pixels (marked in blue) contribute to the calculation of the center pixel (marked in red) through three convolution layers with kernel size 3×3. As shown in FIG. 4(a), all convolutional layers have a dilation rate r=2. As shown in FIG. 4(b), subsequent convolutional layers have dilation rates of r=1, 2, 3, respectively. For a pixel p in a dilated convolutional layer l, the information that contributes to pixel p comes from a nearby $k_d$×$k_d$ region in layer l−1 centered at p. Because dilated convolution introduces zeros in the convolutional kernel, the actual pixels that participate in the computation from the $k_d$×$k_d$ region are just k×k, with a gap of r−1 between them. If k=3 and r=2, only 9 out of 25 pixels in the region are used for the computation (e.g., see FIG. 4 (a)). Because all layers have equal dilation rates r, then for pixel p in the top dilated convolution layer $l_{top}$, the maximum possible number of locations that contribute to the calculation of the value of p is (w'×h')/r² where w', h' are the width and height of the bottom dilated convolution layer, respectively. As a result, pixel p can only view information in a checkerboard fashion, and thus loses a large portion (at least 75% when r=2) of information. When r becomes large in higher layers due to additional downsampling operations, the sample from the input can be very sparse, which may not be good for learning because: 1) local information is completely missing; and 2) the information can be irrelevant across large distances. Another outcome of the gridding effect is that pixels in nearby r×r regions at layer/receive information from a completely different set of "grids", which may impair the consistency of local information.

In various example embodiments described herein, the image processing module 200 uses HDC to implement a solution to address this problem. Instead of using the same dilation rate for all layers after the downsampling occurs, the example embodiment uses a different dilation rate for each layer. The assignment of dilation rate follows a sawtooth or wave-like fashion: a number of layers are grouped together to form the "rising edge" of the wave that has an increasing dilation rate, and the next group repeats the same pattern. For example, for all layers that have dilation rate r=2, the example embodiment forms three succeeding layers as a group, and changes their dilation rates to be 1, 2, and 3, respectively. By doing this, the top layer can access information from a broader range of pixels, in the same region as the original configuration (e.g., see FIG. 4(b)). This process is repeated through all layers, thus making the receptive field unchanged at the top layer.

Another benefit of HDC is that the process can use arbitrary dilation rates through the process, thus naturally enlarging the receptive fields of the network, which is important for recognizing objects that are relatively big. One important thing to note, however, is that the dilation rate within a group should not have a common factor relationship (e.g., like 2, 4, 8, etc.), otherwise the gridding problem will still hold for the top layer. This is a key difference between our HDC approach and the conventional Atrous spatial pyramid pooling (ASPP) module or the context aggregation module, where dilation factors that have common factor relationships are used. In addition, HDC is naturally integrated with the original layers of the network, without any need to add extra modules.

Figure 6:
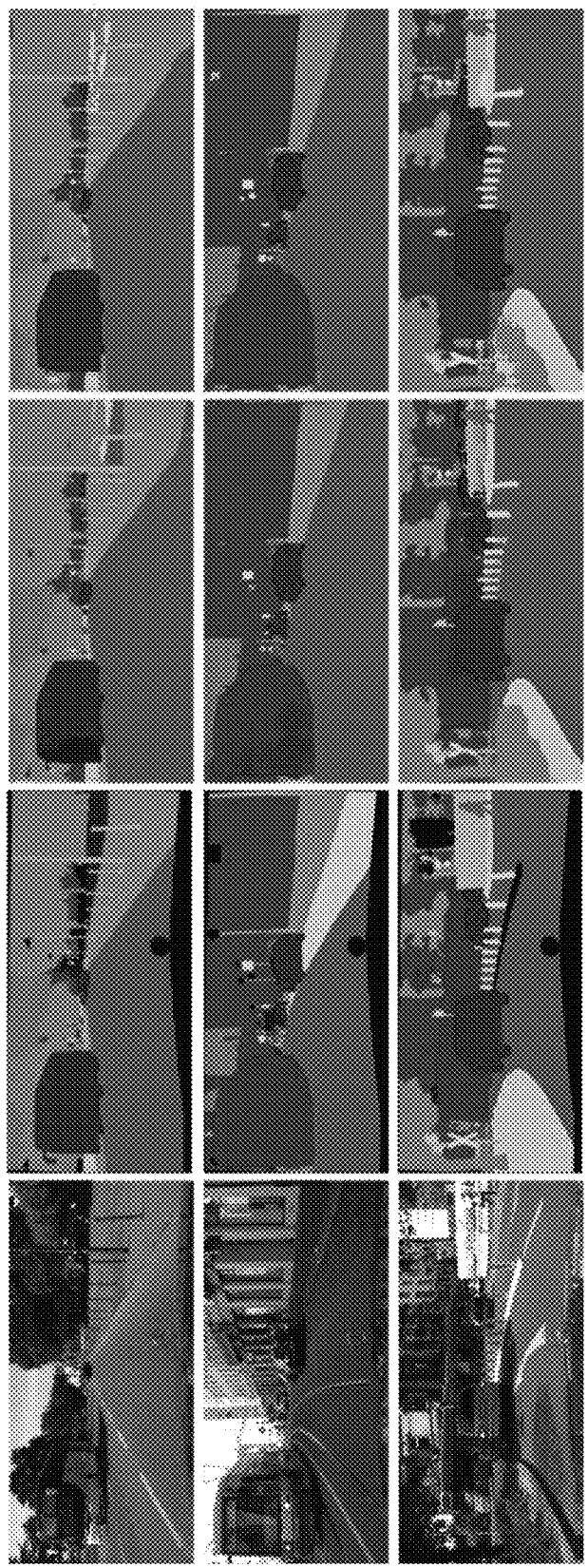
FIG. 6 illustrates an example of the use of the DUC and Hybrid Dilated Convolution (HDC) processes as described herein.

FIG. 6 illustrates an example of the use of the DUC and HDC processes as described herein. FIG. 6 illustrates from left to right, the input image, the ground truth image, the image resulting from the use of the DUC process, and the image resulting from the use of a combination of the DUC-HDC processes (Dilation-bigger).

Figure 7:
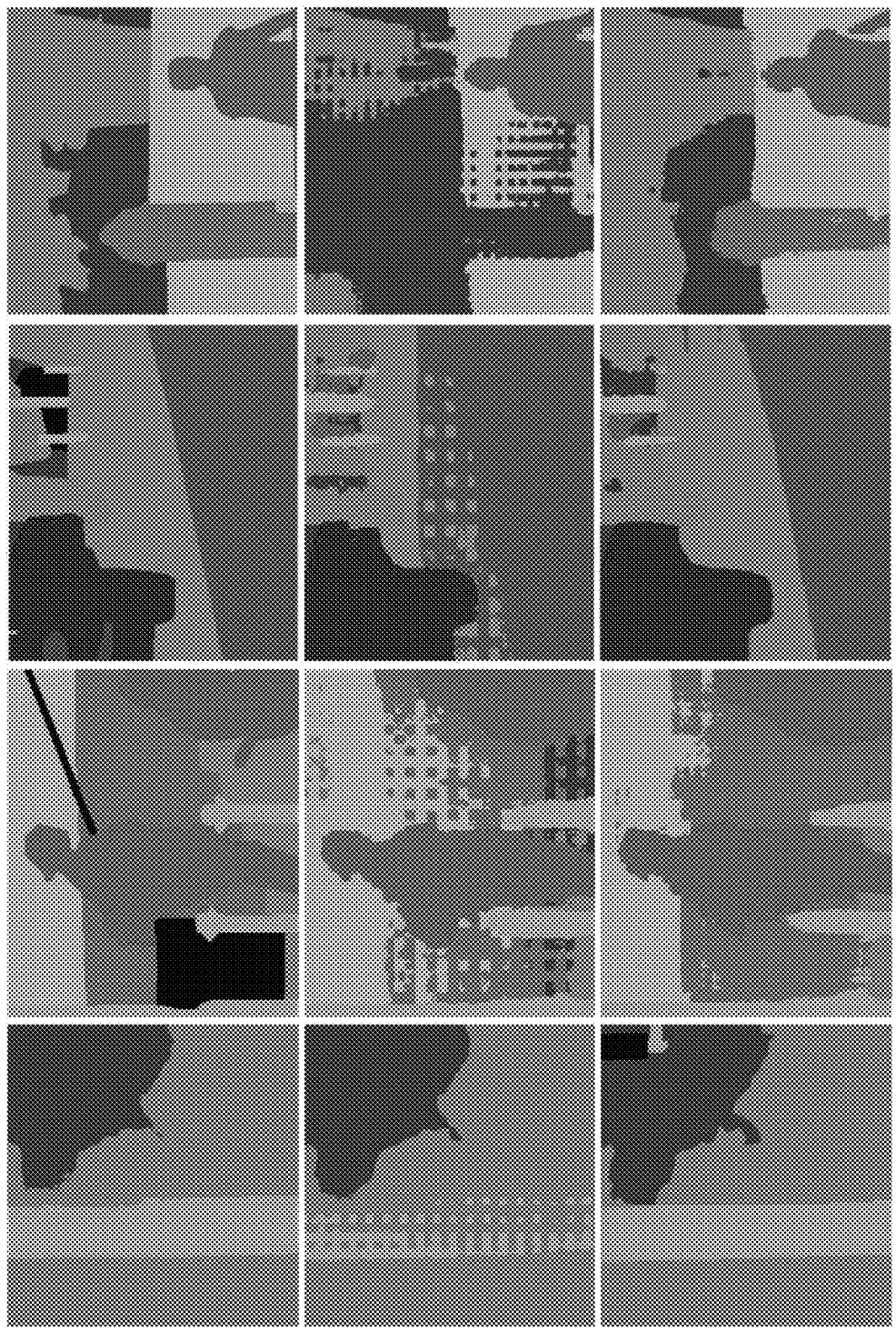
FIG. 7 illustrates an example of the use of the HDC process as described herein.

FIG. 7 illustrates an example of the use of the HDC process as described herein. FIG. 7 illustrates the effectiveness of the HDC process in eliminating the gridding effect. As shown, the first row represents the ground truth patch. The second row shows the prediction of the ResNet-DUC model—a strong gridding effect is observed. The third row illustrates the prediction of the ResNet-DUC-HDC (Dilation-RF) process without producing the gridding effect.

As described in various example embodiments herein, the image processing module 200 can implement simple yet effective convolutional operations for improving semantic segmentation systems. The image processing module 200 of an example embodiment includes a new dense upsampling convolution (DUC) operation to enable pixel-level prediction on feature maps, and hybrid dilated convolution (HDC) to deal with the gridding problem, effectively enlarging the receptive fields of the network. Experimental results demonstrate the effectiveness of our framework on various semantic segmentation tasks.

System and Method for Occluding Contour Detection

In various example embodiments disclosed herein, occluding contour detection is achieved using a contour-detection based approach. Because the global object contour defines both edge and shape information of an object, the contour enables analysis of the region of interest inside the contour at a finer level, which is more accurate than the bounding box obtained from object detection, or the categorical label map obtained from semantic segmentation, where single object-level information is neglected. More importantly, accurate object contours can help us solve a fundamental problem, that is, occluded object detection in an object detection framework, where occluded objects are usually neglected after the bounding box merging process. In example embodiments disclosed herein, we formulate the contour detection problem as an image labeling task that naturally fits into the semantic segmentation framework. By training a fully convolutional network (FCN) end-to-end using Dense Upsampling Convolution (DUC), as described herein, and weighted multi-logistic loss, the disclosed embodiments can effectively detect object-level contours of traffic participants in a traffic environment, and solve the occluded object detection problem.

Figure 8:
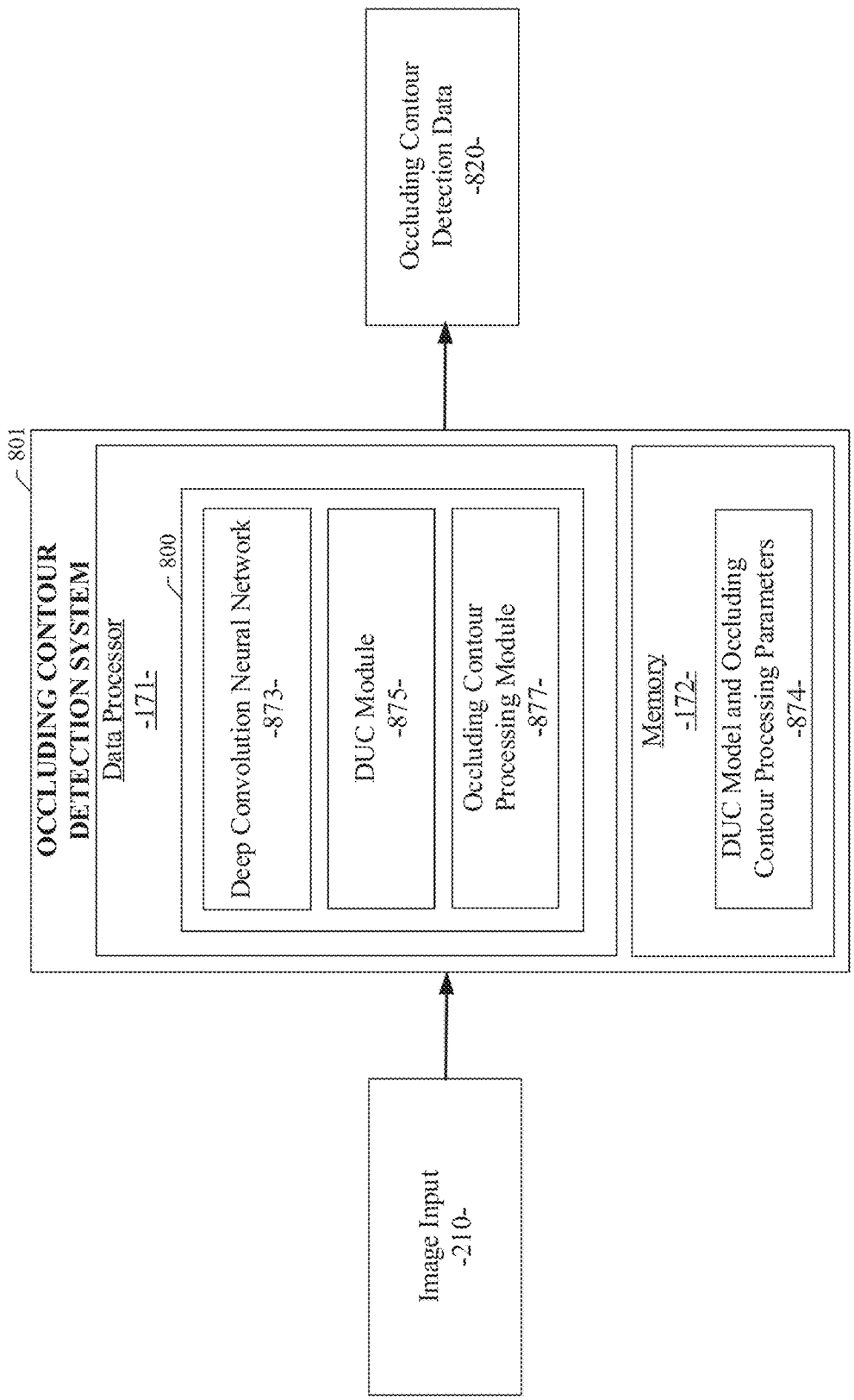
FIG. 8 illustrates the components of the occluding contour detection module of an example embodiment.

Referring now to FIG. 8, a diagram illustrates the components of the occluding contour detection module 800 of an example embodiment. The occluding contour detection module 800 can be used in place of or in combination with the image processing module 200 of ecosystem 101 as described above. In the example embodiment as shown in FIG. 8, the occluding contour detection module 800, as part of the occluding contour detection system 801, can be configured to include a deep convolutional neural network 873, a dense upsampling convolution (DUC) module 875, and an occluding contour processing module 877. In a manner similar to the processing performed by the deep convolutional neural network 173 and the DUC/HDC module 175 as described in detail above, the deep convolutional neural network 873 and the DUC module 875 serve to provide pixel-level semantic segmentation of an input image 210 received from one or more of the vehicle sensor subsystems 144, including one or more cameras. The deep convolutional neural network 873, the DUC module 875, and the occluding contour processing module 877 can be configured as software modules executed by the data processor 171 of the in-vehicle control system 150. The modules 873, 875, and 877 of the occluding contour detection module 800 can receive the image input 210 and produce occluding contour detection data 820, as described in more detail below. The occluding contour detection data 820 represents, for the input image 210, the pixel-level contour definitions for each instance of each object of a particular categorical labeling as determined by semantic segmentation and the processing operations of the occluding contour detection module 800. The pixel-level instance-wise object contour definitions enable the occluding contour detection module 800 to discern occluded and occluding object instances from each other, thereby enabling the vehicle control subsystem to avoid proximate obstacles. As a result, the autonomous control subsystem of the vehicle control subsystem 146 can more efficiently and safely control the vehicle 105. As part of their image processing, the deep convolutional neural network 873, the DUC module 875, and the occluding contour processing module 877 can be configured to work with DUC model and occluding contour processing parameters 874, which can be used to customize and fine tune the operation of the occluding contour detection module 800. The DUC model and occluding contour processing parameters 874 can be stored in a memory 172 of the in-vehicle control system 150.

In the example embodiment, the occluding contour detection module 800 can be configured to include an interface with the in-vehicle control system 150, as shown in FIG. 1, through which the occluding contour detection module 800 can send and receive data as described herein. Additionally, the occluding contour detection module 800 can be configured to include an interface with the in-vehicle control system 150 and/or other ecosystem 101 subsystems through which the occluding contour detection module 800 can receive ancillary data from the various data sources described above. As described above, the occluding contour detection module 800 can also be implemented in systems and platforms that are not deployed in a vehicle and not necessarily used in or with a vehicle.

In an example embodiment as shown in FIG. 8, the occluding contour detection module 800 can be configured to include the deep convolutional neural network 873, the DUC module 875, and the occluding contour processing module 877, as well as other processing modules not shown for clarity. Each of these modules can be implemented as software, firmware, or other logic components executing or activated within an executable environment of the occluding contour detection system 801 operating within or in data communication with the in-vehicle control system 150. Each of these modules of an example embodiment is described in more detail below in connection with the figures provided herein.

Figure 9:
FIGS. 9 through 13 illustrate a first example of the processing performed by the occluding contour detection module of an example embodiment.
Figure 10:

FIGS. 9 through 13 illustrate a first example of the processing performed by the occluding contour detection module 800 of an example embodiment. FIG. 9 illustrates a sample raw input image received as input image 210. FIG. 10 illustrates the result of applying a semantic segmentation operation to the raw input image 210. In various example embodiments described herein, the occluding contour detection module 800 and the DUC module 875 therein can then use DUC to improve pixel-level semantic segmentation. DUC applies convolutional operations directly on the feature maps to get a pixel-wise prediction map. The DUC processing operations can divide the whole label map produced by semantic segmentation into equal subparts, which have the same height and width as the incoming feature map. As described above, all parts are then stacked a total of $r^2$ times to create the whole label map. This is to say, the example embodiment transforms the whole label map into a smaller label map with multiple channels. This transformation allows us to apply the convolution operation directly between the input feature map and the output label maps without the need for inserting extra values in deconvolutional layers (the "unpooling" operation). The DUC process is very helpful for identifying small objects, such as poles, traffic lights, and traffic signs in the input image 210. Thus, pixel-level dense upsampling can recover detailed information that is generally missed by bilinear interpolation.

As illustrated in FIG. 10, different categories of objects are labeled by semantic segmentation using different colors. However, single object-level or instance-wise object information is lost (e.g., all cars are rendered in the same color—blue, as representing the object category label for 'cars'). However, detecting all object instances in a traffic environment, such as individual cars, buses, pedestrians, and bicycles, is crucial for building a safe and effective autonomous driving system. Failure to detect an instance of an object (e.g., a car or a person) may lead to a malfunction or mis-classification in the motion planning module of an autonomous driving car, thus resulting in a catastrophic accident. The semantic segmentation framework provides pixel-level categorical object labeling, but no single object-level instance can be discovered using semantic segmentation alone (e.g., see the example of FIG. 10).

Figure 11:

FIG. 11 illustrates an example of a conventional object detection framework that uses bounding boxes to define the detection of an object in an input image or a semantic segmentation label map. These conventional object detection frameworks that use bounding boxes, although useful, cannot recover the shape of the detected object or deal with the occluded object detection problem (e.g., see FIG. 11). In particular, due to the limitations of the bounding box merging process in the conventional object detection framework that uses bounding boxes, nearby bounding boxes that may belong to different objects or different object instances may be merged together to reduce a false positive rate. As a result, occluded objects or occluded object instances may remain undetected, especially when the occluded region is large. Thus, as shown in FIG. 11, conventional object detection using rectangular bounding boxes cannot recover the shape or contour of different objects or different object instances in the input image. As a result, occluded objects or occluded object instances can be missed from detection due to the merging process of merging a bounding box of an object with the bounding box of the object's neighbor.

Figure 12:
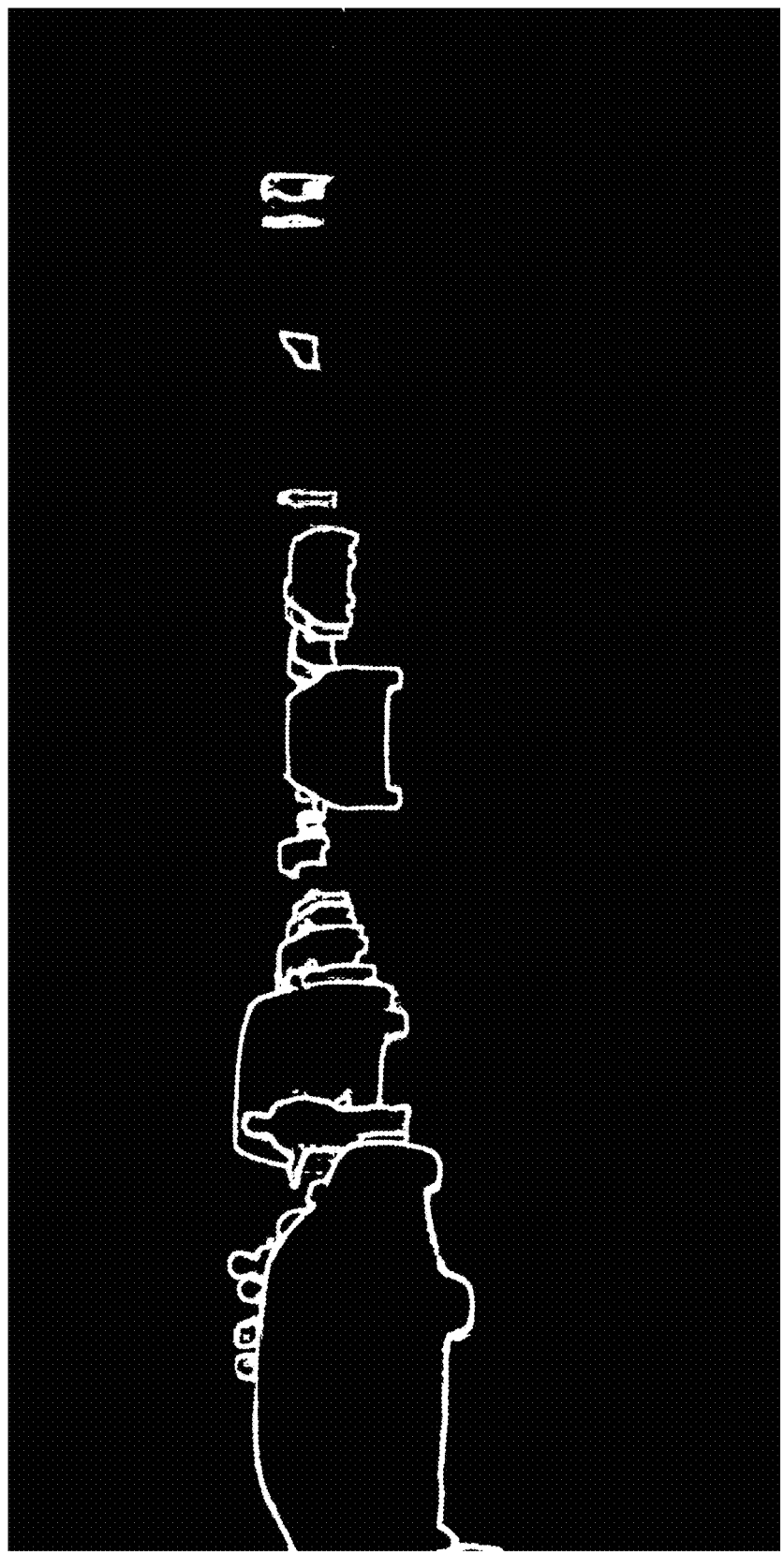

In the various example embodiments described herein, the problems of the conventional object detection frameworks are solved by introducing a contour-detection based approach as used in the example embodiments disclosed herein. The contour-detection based approach as used herein is based on the assumption that just like objects in a specific object category (e.g., cars) share similar global shapes, the object contours and the boundaries of occlusion for objects in the same category also have a uniformly structured shape. For example, as shown in the example of FIG. 12, the occluding boundary between cars parked along the curbside all have similar width and direction. If we can learn this structured information using a computational model, we can recover the object contours and the occlusion boundary and detect the occluded object. In the various example embodiments described herein, this contour detection solution can be formulated as an image labeling task, where both the input image 210 (e.g., a raw RGB image) and the output occluding contour detection data 820 (e.g., a contour detection map) are images. As a result, the various example embodiments described herein use a pixel-level semantic segmentation-based framework to implement an object contour detection based solution. In particular, an example embodiment uses a semantic segmentation framework based on the dense upsampling convolution (DUC) process described above. The DUC process is particularly well-suited for the object contour detection based solution, for the following reasons: 1) the image labeling task requires a decoding module in the FCN in order to recover the original object shape that is the same as the input image, and DUC is a decoding module that fits this need; 2) DUC achieves higher decoding accuracy than other decoding methods, such as bilinear upsampling and deconvolution; and 3) the recovered object contour cannot be too thick, as it may blur far-away objects. DUC can decode contours of arbitrary width, while other methods (such as bilinear upsampling) decode contours of a width of at least eight pixels wide, which is not acceptable in the present application. Again, these benefits demonstrate the usefulness of our DUC method, as the DUC method described herein can be applied to other tasks beyond semantic segmentation.

Figure 13:

Referring again to FIGS. 9, 10, 12, and 13, an example embodiment receives an input image 210. FIG. 9 illustrates a sample raw input image received as input image 210. In an example embodiment and given the raw input image 210, the deep convolutional neural network 873 of the occluding contour detection module 800 can use a ResNet-101-based deep convolutional neural network (CNN) to serve as a feature extraction module. FIG. 10 illustrates the result of applying feature extraction by semantic segmentation to the raw input image 210 to produce a feature map. The DUC module 875 of the occluding contour detection module 800 can then apply a DUC operation on top of the CNN to decode, detect, or produce the contour information of objects and object instances detected in the input image 210. More specifically, the downsample rate of the feature extraction module can be eight, and the DUC module 875 can apply a dilation rate of 2 and 4 on the res4b and res5c modules of the CNN, respectively. The DUC module 875 can be used to decode the feature map after the res5c module to get the resulting contour label map that has the same shape as the input image 210, on a per-pixel basis. FIG. 12 illustrates the result of applying semantic segmentation and the DUC operations to the raw input image 210. Note that no bounding boxes are used or needed in the solution described herein. In various example embodiments described herein, the occluding contour detection module 800 and the DUC module 875 therein can decode the feature map to produce the contour information for object instances detected in the input image 210. The result of this process in an example embodiment is shown in FIG. 12. As shown, accurate shape information for each single-object level, instance-wise object is produced based on the object contour information detected by the DUC module 875. Moreover, neighboring occluded object instances are no longer suppressed. Once the instance-wise contour information for the input image 210 is produced as described above, the occluding contour processing module 877 can apply the contour information onto the input image 210. FIG. 13 illustrates how accurate instance-level object segmentation can be obtained by directly applying the contour detection information onto the input image 210. The object contour information can used by an autonomous control subsystem to control a vehicle 105 without a driver. Thus, occluding object contour detection using a fully convolutional neural network is disclosed.

In an example embodiment, the deep convolutional neural network 873 can be trained and evaluated on the well-known CityScapes dataset or other dataset configured for a traffic environment. To obtain the ground truth of object and occluding contours, the deep convolutional neural network 873 can iterate over all objects in the instance-level semantic segmentation ground truth image, and extract their outer contours using the findcontour function in the well-known OpenCV library. All contours can then be combined together to formulate the ground truth for contour detection. For network training, however, one important issue is the dataset unbalancing problem: the number of pixels that are labeled as "object contour" is less than 1 percent of the number of pixels that are labeled as "non-contour" (or background). If the deep convolutional neural network 873 is trained like this, the neural network will learn nothing but labeling all pixels as "non-contour". To alleviate this problem, the ground-truth contours can be thickened by applying box filters of width two on the label map to increase the number of positive ("contour") examples. Then, a weighted logistic loss function can be used to train the network by setting the weight of the pixel predicted as one ("contour") eight times larger than the weight of the pixel predicted as zero ("non-contour"). This allows the network to put more emphasis on the positive examples by propagating more errors back during training. In an example embodiment, the whole network is trained end-to-end using mini-batch stochastic gradient descent with a batch size of eight, a patch size of 704×704, a learning rate of $1\times10^{-6}$, a momentum of 0.99, and a weight decay of $5\times10'$. An example of the occluding contour detection data 820 is shown in FIG. 13.

Figure 14:
FIGS. 14 through 18 illustrate a second example of the processing performed by the occluding contour detection module of an example embodiment.
Figure 15:
Figure 16:
Figure 17:
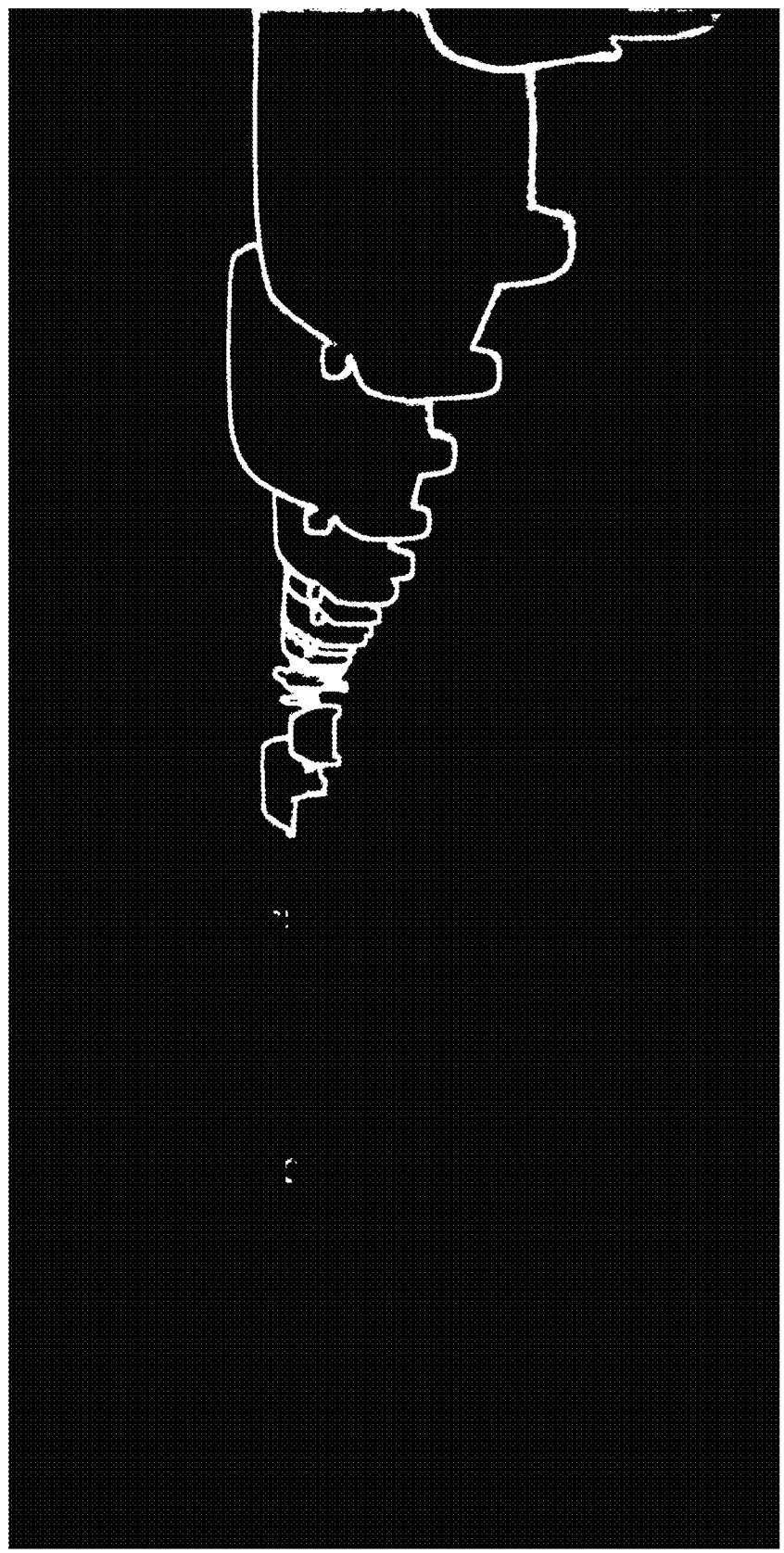
Figure 18:

FIGS. 14 through 18 illustrate a second example of the processing performed by the occluding contour detection module 800 of an example embodiment. FIG. 14 illustrates another sample raw input image received as input image 210. In an example embodiment and given the raw input image 210 shown in FIG. 14, the deep convolutional neural network 873 of the occluding contour detection module 800 can use a ResNet-101-based deep convolutional neural network (CNN) to serve as a feature extraction module. FIG. 15 illustrates the result of applying feature extraction by semantic segmentation to the raw input image 210 shown in FIG. 14 to produce a feature map. The DUC module 875 of the occluding contour detection module 800 can then apply a DUC operation on top of the CNN to decode, detect, or produce the contour information for objects and object instances detected in the input image 210 shown in FIG. 14. The DUC module 875 can decode the feature map to get the resulting contour label map that has the same shape as the input image 210, on a per-pixel basis. FIG. 17 illustrates the result of applying semantic segmentation and the DUC operations to the raw input image 210 shown in FIG. 14. Note that no bounding boxes, such as those shown in FIG. 16, are used or needed in the solution described herein. In various example embodiments described herein, the occluding contour detection module 800 and the DUC module 875 therein can decode the feature map to produce the contour information for object instances detected in the input image 210. The result of this process in an example embodiment is shown in FIG. 17. As shown, accurate shape information for each single-object level, instance-wise object is produced based on the object contour information detected by the DUC module 875. Moreover, neighboring occluded object instances are no longer suppressed. Once the instance-wise contour information for the input image 210 is produced as described above, the occluding contour processing module 877 can apply the contour information onto the input image 210 shown in FIG. 14. FIG. 18 illustrates how accurate instance-level object segmentation can be obtained by directly applying the contour detection information onto the input image 210. The object contour information can used by an autonomous control subsystem to control a vehicle 105 without a driver. Thus, occluding object contour detection using a fully convolutional neural network is disclosed.

Figure 19:
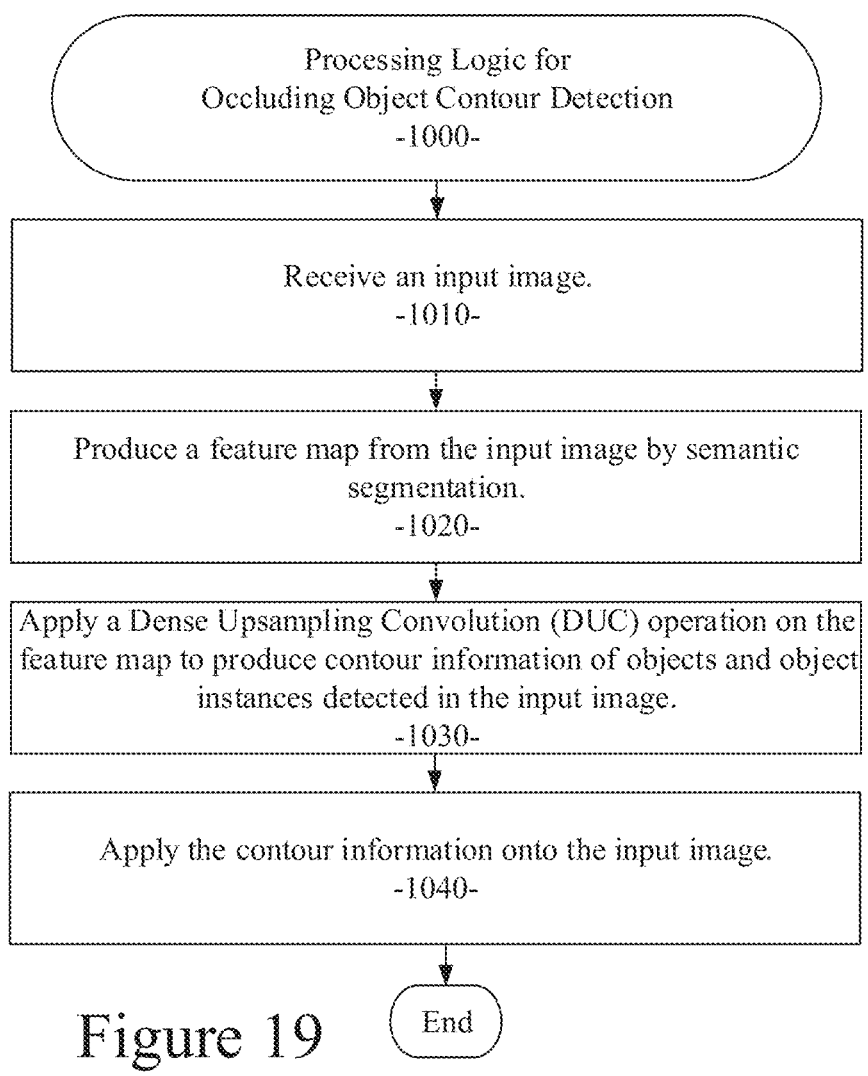
FIG. 19 is a process flow diagram illustrating an example embodiment of a system and method for occluding contour detection.

Referring now to FIG. 19, a flow diagram illustrates an example embodiment of a system and method 1000 for occluding object contour detection. The example embodiment can be configured for: receiving an input image (processing block 1010); producing a feature map from the input image by semantic segmentation (processing block 1020); applying a Dense Upsampling Convolution (DUC) operation on the feature map to produce contour information of objects and object instances detected in the input image (processing block 1030); and applying the contour information onto the input image (processing block 1040).

As used herein and unless specified otherwise, the term "mobile device" includes any computing or communications device that can communicate with the in-vehicle control system 150, the image processing module 200, and/or the occluding contour detection module 800 as described herein to obtain read or write access to data signals, messages, or content communicated via any mode of data communications. In many cases, the mobile device 130 is a handheld, portable device, such as a smart phone, mobile phone, cellular telephone, tablet computer, laptop computer, display pager, radio frequency (RF) device, infrared (IR) device, global positioning device (GPS), Personal Digital Assistants (PDA), handheld computers, wearable computer, portable game console, other mobile communication and/or computing device, or an integrated device combining one or more of the preceding devices, and the like. Additionally, the mobile device 130 can be a computing device, personal computer (PC), multiprocessor system, microprocessor-based or programmable consumer electronic device, network PC, diagnostics equipment, a system operated by a vehicle 119 manufacturer or service technician, and the like, and is not limited to portable devices. The mobile device 130 can receive and process data in any of a variety of data formats. The data format may include or be configured to operate with any programming format, protocol, or language including, but not limited to, JavaScript, C++, iOS, Android, etc.

As used herein and unless specified otherwise, the term "network resource" includes any device, system, or service that can communicate with the in-vehicle control system 150, the image processing module 200, and/or the occluding contour detection module 800 as described herein to obtain read or write access to data signals, messages, or content communicated via any mode of inter-process or networked data communications. In many cases, the network resource 122 is a data network accessible computing platform, including client or server computers, websites, mobile devices, peer-to-peer (P2P) network nodes, and the like. Additionally, the network resource 122 can be a web appliance, a network router, switch, bridge, gateway, diagnostics equipment, a system operated by a vehicle 119 manufacturer or service technician, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein. The network resources 122 may include any of a variety of providers or processors of network transportable digital content. Typically, the file format that is employed is Extensible Markup Language (XML), however, the various embodiments are not so limited, and other file formats may be used. For example, data formats other than Hypertext Markup Language (HTML)/XML or formats other than open/standard data formats can be supported by various embodiments. Any electronic file format, such as Portable Document Format (PDF), audio (e.g., Motion Picture Experts Group Audio Layer 3-MP3, and the like), video (e.g., MP4, and the like), and any proprietary interchange format defined by specific content sites can be supported by the various embodiments described herein.

The wide area data network 120 (also denoted the network cloud) used with the network resources 122 can be configured to couple one computing or communication device with another computing or communication device. The network may be enabled to employ any form of computer readable data or media for communicating information from one electronic device to another. The network 120 can include the Internet in addition to other wide area networks (WANs), cellular telephone networks, metro-area networks, local area networks (LANs), other packet-switched networks, circuit-switched networks, direct data connections, such as through a universal serial bus (USB) or Ethernet port, other forms of computer-readable media, or any combination thereof. The network 120 can include the Internet in addition to other wide area networks (WANs), cellular telephone networks, satellite networks, over-the-air broadcast networks, AM/FM radio networks, pager networks, UHF networks, other broadcast networks, gaming networks, WiFi networks, peer-to-peer networks, Voice Over IP (VoIP) networks, metro-area networks, local area networks (LANs), other packet-switched networks, circuit-switched networks, direct data connections, such as through a universal serial bus (USB) or Ethernet port, other forms of computer-readable media, or any combination thereof. On an interconnected set of networks, including those based on differing architectures and protocols, a router or gateway can act as a link between networks, enabling messages to be sent between computing devices on different networks. Also, communication links within networks can typically include twisted wire pair cabling, USB, Firewire, Ethernet, or coaxial cable, while communication links between networks may utilize analog or digital telephone lines, full or fractional dedicated digital lines including T1, T2, T3, and T4, Integrated Services Digital Networks (ISDNs), Digital User Lines (DSLs), wireless links including satellite links, cellular telephone links, or other communication links known to those of ordinary skill in the art. Furthermore, remote computers and other related electronic devices can be remotely connected to the network via a modem and temporary telephone link.

The network 120 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The network may also include an autonomous system of terminals, gateways, routers, and the like connected by wireless radio links or wireless transceivers. These connectors may be configured to move freely and randomly and organize themselves arbitrarily, such that the topology of the network may change rapidly. The network 120 may further employ one or more of a plurality of standard wireless and/or cellular protocols or access technologies including those set forth herein in connection with network interface 712 and network 714 described in the figures herewith.

In a particular embodiment, a mobile device 132 and/or a network resource 122 may act as a client device enabling a user to access and use the in-vehicle control system 150, the image processing module 200, and/or the occluding contour detection module 800 to interact with one or more components of a vehicle subsystem. These client devices 132 or 122 may include virtually any computing device that is configured to send and receive information over a network, such as network 120 as described herein. Such client devices may include mobile devices, such as cellular telephones, smart phones, tablet computers, display pagers, radio frequency (RF) devices, infrared (IR) devices, global positioning devices (GPS), Personal Digital Assistants (PDAs), handheld computers, wearable computers, game consoles, integrated devices combining one or more of the preceding devices, and the like. The client devices may also include other computing devices, such as personal computers (PCs), multiprocessor systems, microprocessor-based or programmable consumer electronics, network PC's, and the like. As such, client devices may range widely in terms of capabilities and features. For example, a client device configured as a cell phone may have a numeric keypad and a few lines of monochrome LCD display on which only text may be displayed. In another example, a web-enabled client device may have a touch sensitive screen, a stylus, and a color LCD display screen in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript™, EXtensible HTML (xHTML), Compact HTML (CHTML), and the like, to display and send a message with relevant information.

The client devices may also include at least one client application that is configured to receive content or messages from another computing device via a network transmission. The client application may include a capability to provide and receive textual content, graphical content, video content, audio content, alerts, messages, notifications, and the like. Moreover, the client devices may be further configured to communicate and/or receive a message, such as through a Short Message Service (SMS), direct messaging (e.g., Twitter), email, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like. The client devices may also include a wireless application device on which a client application is configured to enable a user of the device to send and receive information to/from network resources wirelessly via the network.

The in-vehicle control system 150, the image processing module 200, and/or the occluding contour detection module 800 can be implemented using systems that enhance the security of the execution environment, thereby improving security and reducing the possibility that the in-vehicle control system 150, the image processing module 200, and/or the occluding contour detection module 800 and the related services could be compromised by viruses or malware. For example, the in-vehicle control system 150, the image processing module 200, and/or the occluding contour detection module 800 can be implemented using a Trusted Execution Environment, which can ensure that sensitive data is stored, processed, and communicated in a secure way.

Figure 20:
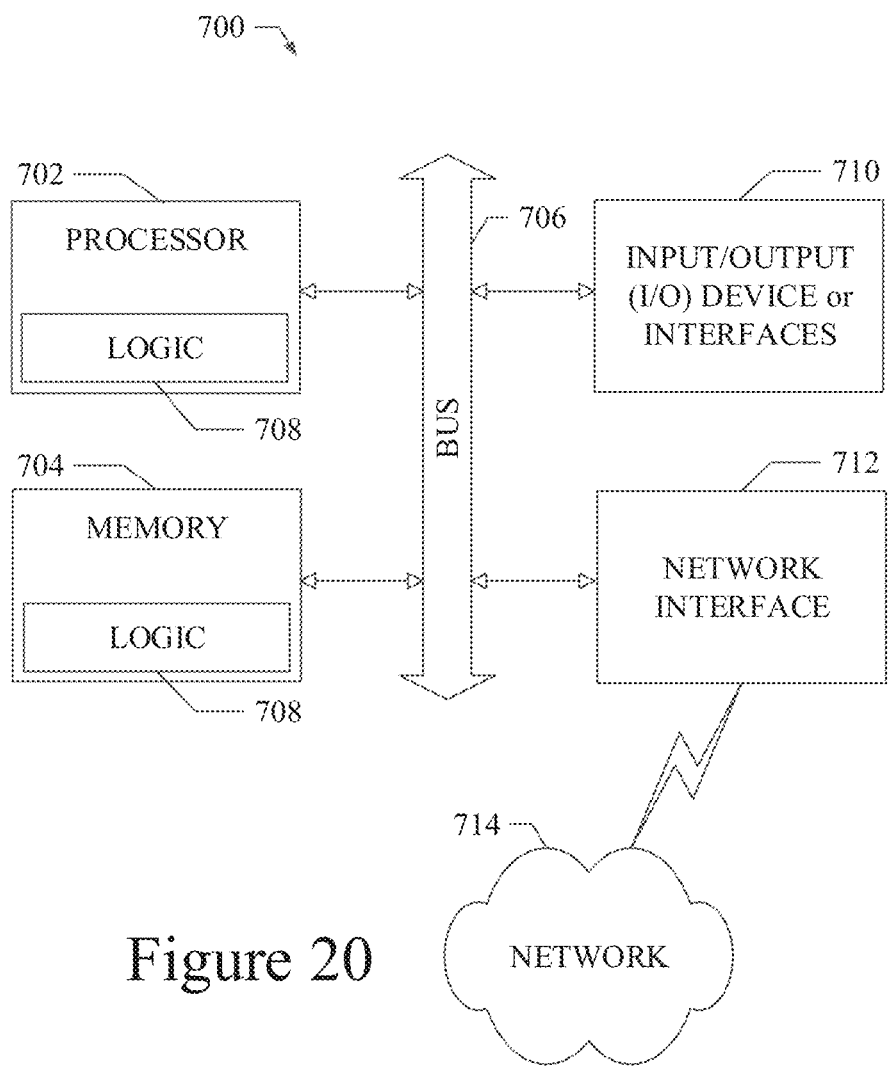
FIG. 20 shows a diagrammatic representation of machine in the example form of a computer system within which a set of instructions when executed may cause the machine to perform any one or more of the methodologies discussed herein.

FIG. 20 shows a diagrammatic representation of a machine in the example form of a computing system 700 within which a set of instructions when executed and/or processing logic when activated may cause the machine to perform any one or more of the methodologies described and/or claimed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a laptop computer, a tablet computing system, a Personal Digital Assistant (PDA), a cellular telephone, a smartphone, a web appliance, a set-top box (STB), a network router, switch or bridge, or any machine capable of executing a set of instructions (sequential or otherwise) or activating processing logic that specify actions to be taken by that machine. Further, while only a single machine is illustrated, the term "machine" can also be taken to include any collection of machines that individually or jointly execute a set (or multiple sets) of instructions or processing logic to perform any one or more of the methodologies described and/or claimed herein.

The example computing system 700 can include a data processor 702 (e.g., a System-on-a-Chip (SoC), general processing core, graphics core, and optionally other processing logic) and a memory 704, which can communicate with each other via a bus or other data transfer system 706. The mobile computing and/or communication system 700 may further include various input/output (I/O) devices and/or interfaces 710, such as a touchscreen display, an audio jack, a voice interface, and optionally a network interface 712. In an example embodiment, the network interface 712 can include one or more radio transceivers configured for compatibility with any one or more standard wireless and/or cellular protocols or access technologies (e.g., 2nd (2G), 2.5, 3rd (3G), 4th (4G) generation, and future generation radio access for cellular systems, Global System for Mobile communication (GSM), General Packet Radio Services (GPRS), Enhanced Data GSM Environment (EDGE), Wideband Code Division Multiple Access (WCDMA), LTE, CDMA2000, WLAN, Wireless Router (WR) mesh, and the like). Network interface 712 may also be configured for use with various other wired and/or wireless communication protocols, including TCP/IP, UDP, SIP, SMS, RTP, WAP, CDMA, TDMA, UMTS, UWB, WiFi, WiMax, Bluetooth©, IEEE 802.11x, and the like. In essence, network interface 712 may include or support virtually any wired and/or wireless communication and data processing mechanisms by which information/data may travel between a computing system 700 and another computing or communication system via network 714.

The memory 704 can represent a machine-readable medium on which is stored one or more sets of instructions, software, firmware, or other processing logic (e.g., logic 708) embodying any one or more of the methodologies or functions described and/or claimed herein. The logic 708, or a portion thereof, may also reside, completely or at least partially within the processor 702 during execution thereof by the mobile computing and/or communication system 700. As such, the memory 704 and the processor 702 may also constitute machine-readable media. The logic 708, or a portion thereof, may also be configured as processing logic or logic, at least a portion of which is partially implemented in hardware. The logic 708, or a portion thereof, may further be transmitted or received over a network 714 via the network interface 712. While the machine-readable medium of an example embodiment can be a single medium, the term "machine-readable medium" should be taken to include a single non-transitory medium or multiple non-transitory media (e.g., a centralized or distributed database, and/or associated caches and computing systems) that store the one or more sets of instructions. The term "machine-readable medium" can also be taken to include any non-transitory medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
a data processor; and
an occluding object contour detection processing module, executable by the data processor, the occluding object contour detection processing module being configured to perform an occluding object contour detection operation using a fully convolutional neural network and dense upsampling convolution (DUC), the occluding object contour detection operation being configured to:
receive an input image;
produce a feature map from the input image by semantic segmentation;
apply a DUC operation on the feature map to produce contour information of objects and object instances detected in the input image; and
apply the contour information onto the input image.

2. The system of claim 1 wherein the semantic segmentation and DUC operation are machine learnable.

3. The system of claim 1 wherein the semantic segmentation is performed by a deep convolutional neural network trained on a dataset configured for a traffic environment.

4. The system of claim 1 wherein the DUC operation is configured operate within a fully convolutional network (FCN).

5. The system of claim 1 wherein the contour information is produced without the use of bounding boxes.

6. The system of claim 1 wherein the contour information is used by an autonomous control subsystem to control a vehicle without a driver.

7. A method comprising:
receiving an input image;
producing a feature map from the input image by semantic segmentation;
applying a Dense Upsampling Convolution (DUC) operation on the feature map to produce contour information of objects and object instances detected in the input image; and
applying the contour information onto the input image.

8. The method of claim 7 wherein the semantic segmentation and DUC operation are machine learnable.

9. The method of claim 7 wherein the semantic segmentation is performed by a deep convolutional neural network trained on a dataset configured for a traffic environment.

10. The method of claim 7 wherein the DUC operation is configured operate within a fully convolutional network (FCN).

11. The method of claim 7 wherein the contour information is produced without the use of bounding boxes.

12. The method of claim 7 wherein the contour information is used by an autonomous control subsystem to control a vehicle without a driver.

13. A non-transitory machine-useable storage medium embodying instructions which, when executed by a machine, cause the machine to:
receive an input image;
produce a feature map from the input image by semantic segmentation;
apply a DUC operation on the feature map to produce contour information of objects and object instances detected in the input image; and
apply the contour information onto the input image.

14. The non-transitory machine-useable storage medium of claim 13 wherein the semantic segmentation and DUC operation are machine learnable.

15. The non-transitory machine-useable storage medium of claim 13 wherein the semantic segmentation is performed by a deep convolutional neural network trained on a dataset configured for a traffic environment.

16. The non-transitory machine-useable storage medium of claim 13 wherein the DUC operation is configured operate within a fully convolutional network (FCN).

17. The non-transitory machine-useable storage medium of claim 13 wherein the contour information is produced without the use of bounding boxes.

18. The non-transitory machine-useable storage medium of claim 13 wherein the contour information is used by an autonomous control subsystem to control a vehicle without a driver.

* * * * *